US011075447B2

(12) United States Patent
Choi et al.

(10) Patent No.: US 11,075,447 B2
(45) Date of Patent: Jul. 27, 2021

(54) ANTENNA FOR WIRELESS COMMUNICATION AND ELECTRONIC DEVICE INCLUDING THE SAME

(71) Applicant: Samsung Electronics Co., Ltd., Gyeonggi-do (KR)

(72) Inventors: Nak Chung Choi, Seoul (KR); Gyu Sub Kim, Seoul (KR); Hyung Joo Lee, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/871,492

(22) Filed: May 11, 2020

(65) Prior Publication Data

US 2020/0274229 A1 Aug. 27, 2020

Related U.S. Application Data

(63) Continuation of application No. 15/698,187, filed on Sep. 7, 2017, now Pat. No. 10,651,542.

(30) Foreign Application Priority Data

Sep. 7, 2016 (KR) .......................... 10-2016-0114921

(51) Int. Cl.
*H01Q 1/24* (2006.01)
*H01Q 3/24* (2006.01)
(Continued)

(52) U.S. Cl.
CPC ............... *H01Q 1/243* (2013.01); *H01Q 1/24* (2013.01); *H01Q 1/245* (2013.01); *H01Q 3/24* (2013.01);
(Continued)

(58) Field of Classification Search
CPC .......... H01Q 1/243; H01Q 3/247; H01Q 9/42; H01Q 21/28; H01Q 1/245; H01Q 5/364; H01Q 1/24; H01Q 3/24
(Continued)

(56) References Cited

U.S. PATENT DOCUMENTS 8,159,399 B2 4/2012 Dorsey et al.
8,270,914 B2 9/2012 Pascolini et al.
(Continued)

FOREIGN PATENT DOCUMENTS

CN 102110873 6/2011
CN 102544753 7/2012
(Continued)

OTHER PUBLICATIONS

European Search Report dated Jan. 22, 2018 issued in counterpart application No. 17189699.6-1205, 10 pages.
(Continued)

*Primary Examiner* — Hai V Tran
(74) *Attorney, Agent, or Firm* — The Farrell Law Firm, P.C.

(57) ABSTRACT

An electronic device is provided, which includes a housing; a conductive member forming at least a part of the housing; first to third nonconductive members separating the conductive member, wherein the conductive member includes a first conductive pattern disposed between the first nonconductive member and the second nonconductive member, and a second conductive pattern disposed between the second nonconductive member and the third nonconductive member; a first feeding part connected to the first conductive pattern; a second feeding part connected to the second conductive pattern; a first ground part connected to the first conductive pattern at a point adjacent to the second non-
(Continued)

conductive member; and a communication circuit electrically connected with the conductive member.

20 Claims, 14 Drawing Sheets

(51) Int. Cl.
| | |
|---|---|
| *H01Q 9/42* | (2006.01) |
| *H01Q 5/364* | (2015.01) |
| *H01Q 21/28* | (2006.01) |
| *H01Q 5/35* | (2015.01) |
| *H01Q 1/48* | (2006.01) |
| *H01Q 7/00* | (2006.01) |
| *H01Q 9/04* | (2006.01) |
| *H04M 1/02* | (2006.01) |

(52) U.S. Cl.
CPC ............ *H01Q 3/247* (2013.01); *H01Q 5/364* (2015.01); *H01Q 9/42* (2013.01); *H01Q 21/28* (2013.01); *H01Q 1/48* (2013.01); *H01Q 5/35* (2015.01); *H01Q 7/00* (2013.01); *H01Q 9/0421* (2013.01); *H04M 1/0266* (2013.01)

(58) Field of Classification Search
USPC ........................................................ 343/702
See application file for complete search history.

(56) References Cited

U.S. PATENT DOCUMENTS

| | | | |
|---|---|---|---|
| 9,178,270 | B2 | 1/2015 | Vanjani et al. |
| 8,947,302 | B2 | 2/2015 | Caballero et al. |
| 9,209,849 | B2 | 12/2015 | Kim et al. |
| 9,437,935 | B2 | 9/2016 | DeLuis et al. |
| 9,806,401 | B2 | 10/2017 | Caballero et al. |
| 10,020,563 | B2 | 7/2018 | Caballero et al. |
| 2009/0295648 | A1 | 12/2009 | Dorsey et al. |
| 2011/0065429 | A1 | 3/2011 | Kim et al. |
| 2011/0065477 | A1 | 3/2011 | Ko et al. |
| 2011/0136447 | A1 | 6/2011 | Pascolini et al. |
| 2012/0112970 | A1* | 5/2012 | Caballero ................ H01Q 7/00 343/702 |
| 2013/0009828 | A1 | 1/2013 | Pascolini et al. |
| 2013/0194139 | A1* | 8/2013 | Nickel .................... H01Q 5/328 343/703 |
| 2013/0241800 | A1 | 9/2013 | Schlub et al. |
| 2014/0242903 | A1 | 8/2014 | DeLuis et al. |
| 2015/0145734 | A1* | 5/2015 | Caballero ............ H01Q 9/0421 343/702 |
| 2015/0194738 | A1 | 7/2015 | Hu et al. |
| 2015/0234077 | A1 | 8/2015 | Komulainen |
| 2015/0372372 | A1* | 12/2015 | Lee ........................ H01Q 1/243 343/702 |
| 2017/0048363 | A1* | 2/2017 | Lee ........................ H01Q 1/521 |
| 2017/0302771 | A1* | 10/2017 | Kim ........................ H01Q 1/243 |
| 2018/0053990 | A1 | 2/2018 | Caballero et al. |
| 2019/0013570 | A1 | 1/2019 | Caballero et al. |
| 2019/0140342 | A1 | 5/2019 | Lim |

FOREIGN PATENT DOCUMENTS

| | | |
|---|---|---|
| CN | 203536554 | 4/2014 |
| CN | 104993241 | 10/2015 |
| KR | 10-2011-0028035 | 3/2011 |
| KR | 10-2011-0029647 | 3/2011 |
| KR | 10-2015-0039758 | 4/2015 |
| KR | 10-2015-0122746 | 11/2015 |

OTHER PUBLICATIONS

European Search Report dated Jan. 24, 2019 issued in counterpart application No. 17189699.6-1205, 10 pages.
Chinese Office Action dated Apr. 30, 2019 issued in counterpart application No. 201710800424.X, 15 pages.
Chinese Office Action dated Dec. 3, 2019 issued in counterpart application No. 201710800424.X, 16 pages.

* cited by examiner

ANTENNA FOR WIRELESS COMMUNICATION AND ELECTRONIC DEVICE INCLUDING THE SAME

PRIORITY

This application is a Continuation of U.S. application Ser. No. 15/698,187, filed with the U.S. Patent and Trademark Office on Sep. 7, 2017, and claims priority under 35 U.S.C. § 119(a) to Korean Patent Application Serial No. 10-2016-0114921, which was filed in the Korean Intellectual Property Office on Sep. 7, 2016, the entire disclosure of each of which is incorporated herein by reference.

BACKGROUND

1. Field of the Disclosure

The present disclosure relates generally to an antenna that performs wireless communication with an external device and an electronic device including the same.

2. Description of the Related Art

An electronic device such as a smailphone, a tablet personal computer (PC), etc., may transmit and receive various data to and from an external device. The electronic device may perform long distance communication (e.g., mobile communication such as a voice call or wireless data communication), short range communication (e.g., Bluetooth communication or wireless fidelity (Wi-Fi) communication), and/or ultra-short range communication (e.g., wireless payment, wireless charging, or near field communication (NFC)).

Generally, a part (e.g., a side surface or a rear surface) of an outer housing of an electronic device is implemented using a metal frame, which may be used as a radiator of an antenna for wireless communication. The metal frame may be separated by using a segment formed by an insulating material (e.g., plastic) at portion thereof, thereby forming an electrical length for wireless communication.

A conventional electronic device may include a plurality of multi-band antennas to simultaneously transmit and receive signals of various bands, such as three-carrier aggregation (3CA), 4Rx, 2Tx, etc., (or to operate in a dual standby state). However, it is difficult to mount a plurality of antennas due to a limitation of mounting space in the electronic device.

Additionally, when a plurality of antennas are mounted in a limited space, communication performance may decrease due to mutual interference.

Also, when a user grips the electronic device or places his/her head near an antenna for calling, electromagnetic waves, which may be harmful to the user, are generated due to an increase in a specific absorption rate (SAR).

SUMMARY

Accordingly, the present disclosure is made to address at least the above-mentioned problems and/or disadvantages and to provide at least the advantages described below.

Accordingly, an aspect of the present disclosure is to provide an electronic device including a plurality of multi-band antennas by using conductive patterns separated through a plurality of nonconductive members.

Another aspect of the present disclosure is to provide an electronic device that allows a plurality of multi-band antennas to transmit and receive a signal of the same frequency band.

Another aspect of the present disclosure is to provide an electronic device that simultaneously transmits and receives signals of different frequency bands through switching or operates in a dual standby state.

Another aspect of the present disclosure is to provide an electronic device that prevents communication performance degradation due to contact with a user.

In accordance with an aspect of the present disclosure, an electronic device is provided, which includes a housing; a conductive member forming at least a part of the housing; first to third nonconductive members separating the conductive member, wherein the conductive member includes a first conductive pattern disposed between the first nonconductive member and the second nonconductive member, and a second conductive pattern disposed between the second nonconductive member and the third nonconductive member; a first feeding part connected to the first conductive pattern; a second feeding part connected to the second conductive pattern; a first ground part connected to the first conductive pattern at a point adjacent to the second nonconductive member; and a communication circuit electrically connected with the conductive member.

In accordance with another aspect of the present disclosure, an electronic device is provided, which includes a display; a housing including a first surface including the display, a second surface opposite to the first surface, and a side surface disposed between the first surface and the second surface; a first communication circuit; and a second communication circuit. The side surface includes a first conductive pattern, a second conductive pattern, a first nonconductive member, a second nonconductive member, and a third nonconductive member. The first conductive pattern is disposed between the first nonconductive member and the second nonconductive member. The second conductive pattern is disposed between the second nonconductive member and the third nonconductive member. The first conductive pattern is connected to the first communication circuit through a first feeding part. The second conductive pattern is connected to the second communication circuit through a second feeding part. The second conductive pattern is connected with a ground part at a point spaced apart from the second nonconductive member by a preset distance for isolation of the first conductive pattern.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
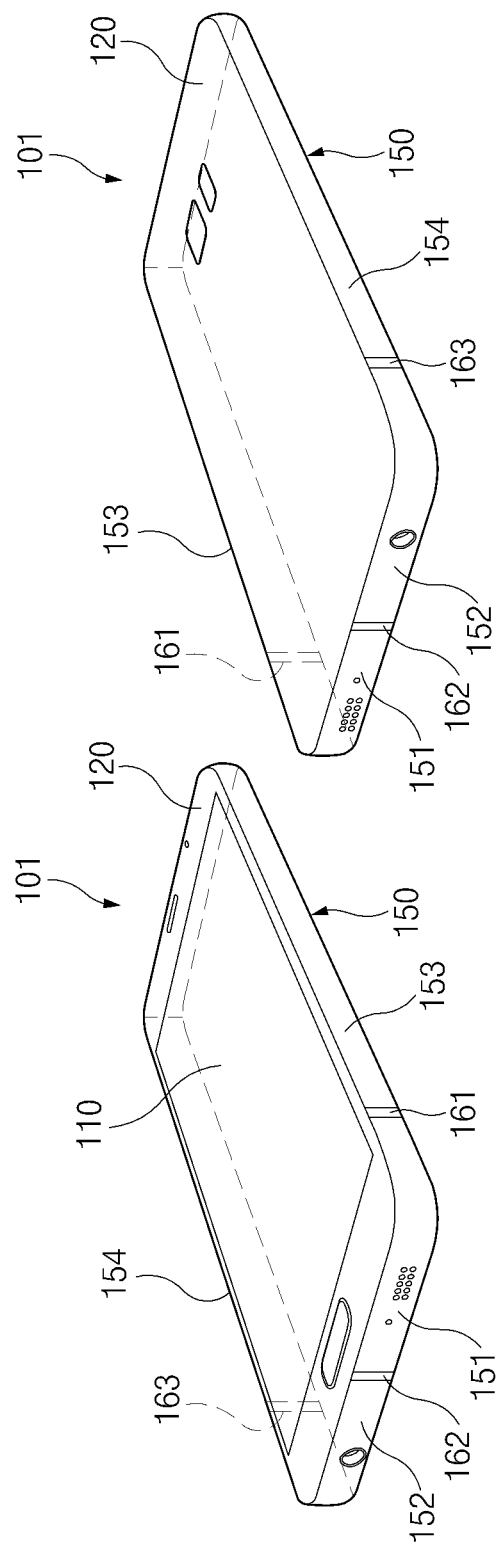
FIG. 1 illustrates an electronic device according to an embodiment of the present disclosure.

Hereinafter, various embodiments of the present disclosure will be described with reference to the accompanying drawings. Accordingly, those of ordinary skill in the art will recognize that modifications, equivalents, and/or alternatives of the various embodiments described herein may be made without departing from the scope and spirit of the present disclosure.

With regard to description of drawings, similar components may be identified by similar reference numerals.

The terms and expressions in this disclosure are used to describe specified embodiments and are not intended to limit the scope of the present disclosure. Terms of a singular form may include plural forms unless otherwise specified.

Unless otherwise defined herein, all of the terms, which include technical or scientific terms, may have the same meanings that are generally understood by a person skilled in the art. Terms that are defined in a dictionary and commonly used, should also be interpreted as is customary in the relevant related art and not in idealized or overly formal ways, unless expressly defined as such herein. However, even if terms are defined in the specification, they may not be interpreted to exclude embodiments of the present disclosure.

Herein, the expressions "have", "may have", "include", "comprise", "may include", and "may comprise" indicate the existence of corresponding features (e.g., elements such as numeric values, functions, operations, and/or components) but do not exclude the presence of additional features.

The expressions "A or B", "at least one of A or/and B", "one or more of A or/and B", etc., may include any and all combinations of one or more of the associated listed items. For example, "A or B", "at least one of A and B", or "at least one of A or B" may refer to (1) where at least one A is included, (2) where at least one B is included, or (3) where both of at least one A and at least one B are included.

The terms, such as "first", "second", etc., may refer to various elements of various embodiments of the present disclosure, but do not limit the elements. For example, such terms may be used to distinguish one element from another element, but do not limit the order and/or priority of the elements. Accordingly, a first user device and a second user device may represent different user devices, irrespective of sequence or importance. Therefore, without departing the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), the first element may be directly coupled with/to or connected to the second element or an intervening element (e.g., a third element) may be present therebetween. However, when the first element is referred to as being "directly coupled with/to" or "directly connected to" the second element, there are no intervening elements therebetween.

According to context, the expression "configured to" may be interpreted as "suitable for", "having the capacity to", "designed to", "adapted to", "made to", or "capable of". The term "configured to (or set to)" does not necessarily mean "specifically designed to" in hardware. Instead, "a device configured to" may indicate that the device is "capable of" operating together with another device or other components.

A "processor configured to (or set to) perform A, B, and C" may mean a dedicated processor (e.g., an embedded processor) for performing a corresponding operation or a generic-purpose processor (e.g., a central processing unit (CPU) or an application processor (AP)), which may perform corresponding operations by executing one or more software programs that are stored in a memory device.

An electronic device according to an embodiment of the present disclosure may include a smailphone, a tablet PC, a mobile phone, a video telephone, an electronic book reader, a desktop PC, a laptop PC, a netbook computer, a workstation, a server, a personal digital assistant (PDA), a portable multimedia player (PMP), an MP3 player, a mobile medical device, a camera, and a wearable device. A wearable device may include an accessory type device (e.g., a watch, a ring, a bracelet, an ankle bracelet, glasses, a contact lens, or a head-mounted device (HMD)), cloth-integrated type device (e.g., electronic clothes), a body-attached type device (e.g., a skin pad or a tattoo), or an implantable type device (e.g., an implantable circuit).

An electronic device may also be a home appliance, such as a digital video disk (DVD) player, an audio player, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic panel.

An electronic device may include a medical device (e.g., a portable medical measurement device, such as a blood glucose meter, a heart rate measuring device, a blood pressure measuring device, or a body temperature measuring device), a magnetic resonance angiography (MRA) device, a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, an electronic device for a vessel (e.g., a navigation device for a vessel and a gyro compass), an avionics device, a security device, a vehicular head unit, an industrial or home robot, an automatic teller machine (ATM), a point of sales (POS) device, or an Internet of things (IoT) device (e.g., a light bulb, a sensor, an electricity or gas meter, a spring cooler device, a fire alarm device, a thermostat, an electric pole, a toaster, a sporting apparatus, a hot water tank, a heater, and a boiler).

An electronic device may also include at least one of furniture, a part of a building/structure, an electronic board, an electronic signature receiving device, a projector, or a measurement device (e.g., a water service, electricity, gas, or electric wave measuring device).

An electronic device may also be a flexible electronic device.

An electronic device may also be a combination of the aforementioned devices.

Further, an electronic device according to an embodiment of the present disclosure is not limited to the aforementioned devices, but may include new electronic devices produced due to the development of new technologies.

Herein, the term "user" may refer to a person who uses an electronic device or may refer to a device (e.g., an artificial intelligence electronic device) that uses the electronic device.

FIG. 1 illustrates an electronic device according to an embodiment of the present disclosure.

Referring to FIG. 1, the electronic device 101, e.g., a smartphone or a tablet PC, may transmit and receive data to and from an external device through various communication schemes, such as long distance communication (e.g., mobile communication such as voice communication or wireless data communication), short range communication (e.g., Bluetooth communication or Wi-Fi communication), or an ultra-short range communication (e.g., wireless payment, wireless charging, or NFC communication). Accordingly, the electronic device 101 may include various antennas for executing the communication schemes.

The electronic device 101 may include a plurality of antennas capable of transmitting and receiving a multi-band frequency signal. Frequency bands of the antennas may be the same as or different from each other. For example, a first antenna may transmit and receive frequency signals of a high band and a middle band, and a second antenna may transmit and receive frequency signals of the middle band and a low band.

Alternatively, the first antenna and the second antenna may all transmit and receive a signal of the high/middle/low band and may have different operating characteristics. In this case, the first antenna and the second antenna may be designed to correspond to a wide-band frequency signal through complementing each other.

The electronic device 101 includes a display 110 and a housing (or body) 120. The display 110 may output a variety of content (e.g., a text or an image). The display 110 may receive an input of a user through a touch input.

The display 110 and buttons (e.g., a home button, a volume button, etc.) are mounted on the housing 120, and a processor for driving the electronic device 101, a module, a sensor, an antenna, a circuit board, etc., may be mounted in the housing 120. The housing 120 may protect the display 110, the internal circuits, etc. The housing 120 includes a first surface on which the display 110 is disposed, a second surface facing the first surface, and side surfaces disposed between the first surface and the second surface.

The housing 120 includes a conductive member (e.g., a metal frame) 150. The conductive member 150 may be connected with a feeding part, a ground part, etc., in order to be used as part (e.g., a radiator) of an antenna capable of transmitting and receiving a wireless signal to and from an external device. The conductive member 150 may be connected with a board (e.g., a printed circuit board (PCB)) and a circuit (e.g., a communication circuit) within the housing 120.

Although the conductive member 150 surrounds a side area of the electronic device 101 in FIG. 1, the present disclosure is not be limited thereto. For example, at least a part of the conductive member 150 may be disposed on a front surface (a surface on which the display 110 is disposed) or a rear surface (a surface on which a rear cover is disposed) of the electronic device 101.

The conductive member 150 may include a plurality of conductive patterns that are separated through a plurality of nonconductive members. Although the conductive member 150 is segmented into first to fourth conductive patterns 151 to 154 by first to third nonconductive members 161 to 163 in FIG. 1, the present disclosure is not limited thereto.

The first to third nonconductive members 161 to 163 are disposed between the first to fourth conductive patterns 151 to 154. The nonconductive members 161 to 163 extend in a direction perpendicular to the front surface (the surface on which the display 110 is disposed) or the rear surface of the electronic device 101.

The first conductive pattern 151 to the fourth conductive pattern 154 may operate as a radiator of an antenna for wireless communication. The first conductive pattern 151 to the fourth conductive pattern 154 may form a plurality of multi-band antennas. For example, the first conductive pattern 151 and the third conductive pattern 153 may form a first antenna that transmits and receives a signal of a first frequency band, and the second conductive pattern 152 and the fourth conductive pattern 154 may form a second antenna that transmits and receives a signal of a second frequency band.

Figure 2A:
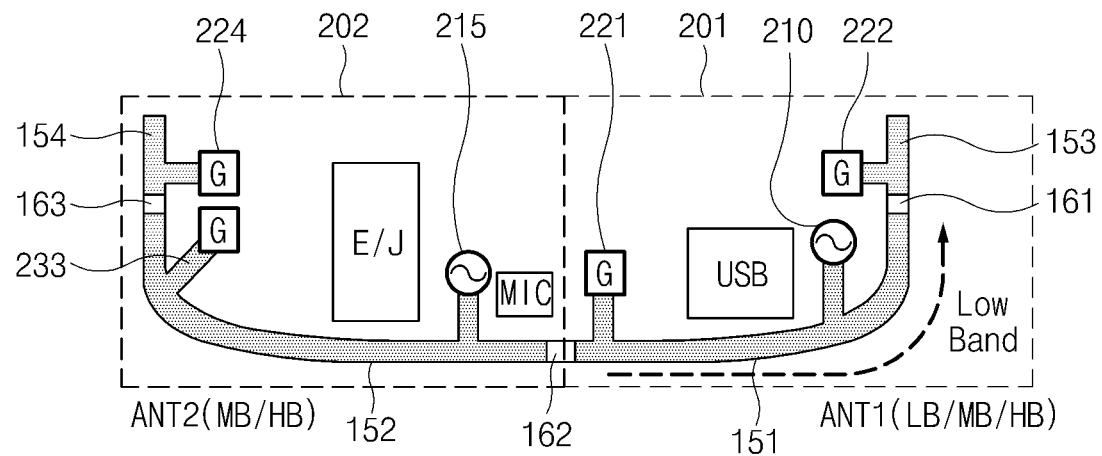
FIGS. 2A and 2B illustrates a plurality of multi-band antennas formed by using a metal frame of an electronic device according to an embodiment of the present disclosure.
Figure 2B:
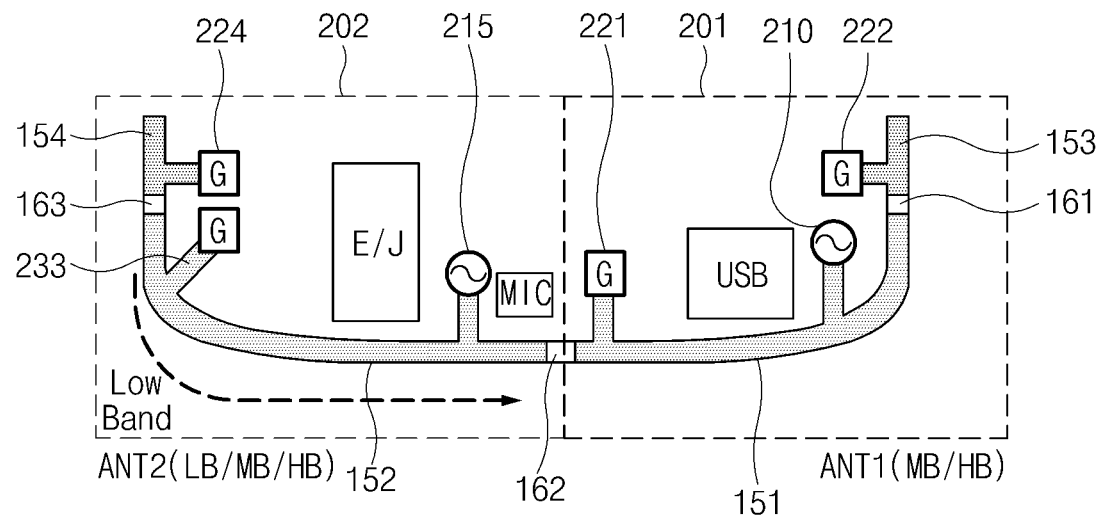

FIGS. 2A and 2B illustrate a plurality of multi-band antennas formed by using a metal frame of an electronic device according to an embodiment of the present disclosure. as Although FIGS. 2A and 2B illustrate a first antenna 201 and a second antenna 202 being formed on a lower end of a side surface of the electronic device, the present disclosure is not be limited thereto.

Referring to FIGS. 2A and 2B, the first conductive pattern 151 and the third conductive pattern 153 form the first antenna 201 and as the second conductive pattern 152 and the fourth conductive pattern 154 form the second antenna 202. However, the present disclosure may not be limited thereto.

Although the first antenna 201 and the second antenna 202 are illustrated as being distinguishable from each other with respect to the second nonconductive member 162 in FIGS. 2A and 2B, the present disclosure is not be limited thereto. For example, the second antenna 202 may use a conductive pattern between the second nonconductive member 162 and a first ground part 221.

Referring to FIG. 2A, the first antenna 201 includes the first conductive pattern 151, the third conductive pattern 153, a first feeding part 210, a first ground part 221, and a second ground part 222. The first antenna 201 may transmit and receive a signal of a specified frequency band to and from an external device by using the first conductive pattern 151 and the third conductive pattern 153.

The first feeding part 210 may connect the first conductive pattern 151 with a communication circuit (e.g., a radio frequency (RF) circuit, an RF module, etc.) capable of transmitting and receiving an RF signal. The first feeding part 210 may be a point to which RF signal for an operation of the first antenna 201 is supplied. The first feeding part 210 may be connected to the first conductive pattern 151 between the first nonconductive member 161 and a point to which the first ground part 221 is connected.

The first ground part 221 may be connected to the first conductive pattern 151. The first ground part 221 may be disposed adjacent to the second nonconductive member 162. The first ground part 221 may be connected to the first conductive pattern 151 within a specified first distance range from the second nonconductive member 162.

The second ground part 222 may be connected to the third conductive pattern 153. The second ground part 222 may be disposed adjacent to the first nonconductive member 161.

The first antenna 201 may operate as an inverted F antenna (IFA) transmitting and receiving a multi-band signal. For example, the first antenna 201 may be configured to transmit and receive a signal included in the low band (e.g., an 800 MHz band) or the middle band (e.g., a 1500 MHz band).

The second antenna 202 includes the second conductive pattern 152, the fourth conductive pattern 154, a second feeding part 215, a third ground part 233, and a fourth ground part 224. The second antenna 202 may transmit and receive a signal of a specified frequency band to and from the external device by using the second conductive pattern 152 and the fourth conductive pattern 154.

The second feeding part 215 may connect the second conductive pattern 152 with the communication circuit (e.g., an RF circuit, an RF module, etc.) capable of transmitting and receiving an RF signal. The second feeding part 215 may be a point to which RF signal for an operation of the second antenna 202 is supplied. The second feeding part 215 may be connected to the second conductive pattern 152 between the second nonconductive member 162 and a point to which the third ground part 233 is connected. The second feeding part 215 may be connected to the second conductive pattern 152 within a specified second distance range from the second nonconductive member 162.

The third ground part 233 may be connected to the second conductive pattern 152. The third ground part 233 may be disposed adjacent to the third nonconductive member 163.

The fourth ground part 224 may be connected to the fourth conductive pattern 154. The fourth ground part 224 may be disposed adjacent to the third nonconductive member 163.

The second antenna 202 may operate as a loop antenna transmitting and receiving a multi-band signal. For example, the second antenna 202 may be configured to transmit and receive a signal included in the middle band (e.g., a 1500 MHz band) or the high band (e.g., a 2400 MHz band).

Referring to FIG. 2B, frequency bands of the first antenna 201 and the second antenna 202 may be changed or exchanged through switching. The switching may be executed through a switching structure connected to the first feeding part 210 and the second feeding part 215.

For example, in a pre-switching state (e.g., the state of FIG. 2A), the first antenna 201 may be designed to transmit and receive a signal included in the low band (e.g., the 800 MHz band) or the middle band (e.g., the 1500 MHz band), and the second antenna 202 may be designed to transmit and receive a signal included in the middle band (e.g., the 1500 MHz band) or the high band (e.g., the 2400 MHz band), higher than a band corresponding to the first antenna 201.

If switching is made in the switching circuit, frequency bands of the first antenna 201 and the second antenna 202 may be exchanged as illustrated in FIG. 2B. In this case, the first antenna 201 may be designed to transmit and receive a signal included in the middle band (e.g., the 1500 MHz band) or the high band (e.g., the 2400 MHz band), and the second antenna 202 may be designed to transmit and receive a signal included in the low band (e.g., the 800 MHz band) or the middle band (e.g., the 1500 MHz band) lower than the corresponding band of the first antenna 201.

Figure 3A:
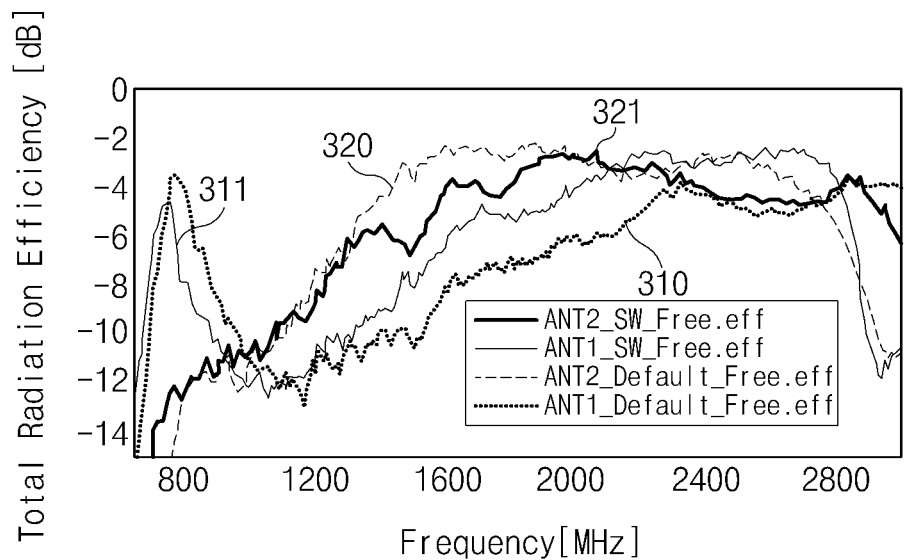
FIG. 3A is a graph illustrating radiation efficiency of a first antenna and a second antenna before and after switching according to an embodiment of the present disclosure.

FIG. 3A is a graph illustrating radiation efficiency of a first antenna and a second antenna before and after switching according to an embodiment of the present disclosure.

Referring to FIG. 3A, the radiation efficiency graph represents a ratio of power of an electromagnetic wave signal radiated from an antenna to power supplied to the antenna.

In a pre-switching state (e.g., the state of FIG. 2A), the first antenna 201 may operate in the form of the graph 310. The first antenna 201 may operate as a multi-band antenna, and a radiation efficiency associated with a signal of the low band (e.g., the 800 MHz band) may be higher than a radiation efficiency associated with a signal of the middle band (e.g., the 1500 MHz band) or the high band (e.g., the 2400 MHz band).

In a post-switching state (e.g., the state of FIG. 2B), the first antenna 201 may operate in the form of a graph 311. In the first antenna 201, compared with the pre-switching state, a radiation efficiency associated with a signal of the low band (e.g., the 800 MHz band) may decrease (e.g., from −4 dB to −8 dB), and a radiation efficiency associated with a signal of the middle band (e.g., the 1600 MHz band) and a signal of the high band (e.g., the 2400 MHz band) may increase.

In the pre-switching state, the second antenna 202 may operate in the form of a graph 320. The second antenna 202 may also operate as a multi-band antenna, and a radiation efficiency associated with a signal of the middle band (e.g., the 1500 MHz band) or the high band (e.g., the 2400 MHz band) may be higher than a radiation efficiency associated with a signal of the low band (e.g., the 800 MHz band).

In the post-switching state, the second antenna 202 may operate in the form of a graph 321. In the second antenna 202, compared with the pre-switching state, a radiation efficiency associated with the middle band (e.g., a 1600 MHz band) and the high band (e.g., a 2400 MHz band) may decrease.

A communication circuit in the electronic device 101 may change characteristics of the first antenna 201 and the second antenna 202 by changing a matching value. The communication circuit may adjust an impedance matching value such that each antenna transmits and receives a signal of a necessary frequency band.

Figure 3B:
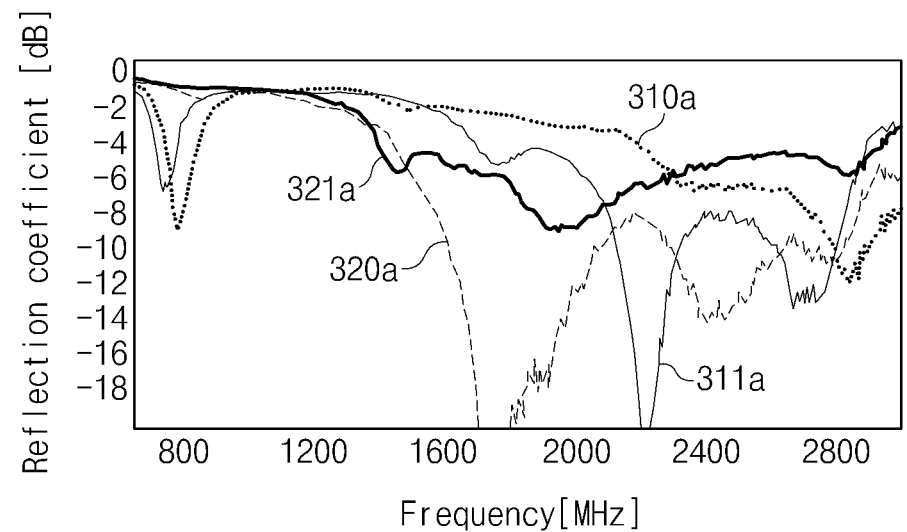
FIG. 3B is a graph illustrating a reflection coefficient of the first antenna and the second antenna before and after switching according to an embodiment of the present disclosure.

FIG. 3B is a graph illustrating a reflection coefficient of a first antenna and a second antenna before and after switching according to an embodiment of the present disclosure.

Referring to FIG. 3B, the reflection coefficient graph represents a change in an input reflection coefficient according to an antenna frequency. As illustrated therein, a signal of the corresponding frequency band is received more effectively as an input reflection coefficient becomes smaller.

In a pre-switching state, the first antenna 201 may operate in the form of a graph 310a. In a post-switching state, the first antenna 201 may operate in the form of a graph 311a.

In the pre-switching state, the second antenna 202 may operate in the form of a graph 320a. In the post-switching state, the second antenna 202 may operate in the form of a graph 321a.

Figure 4A:
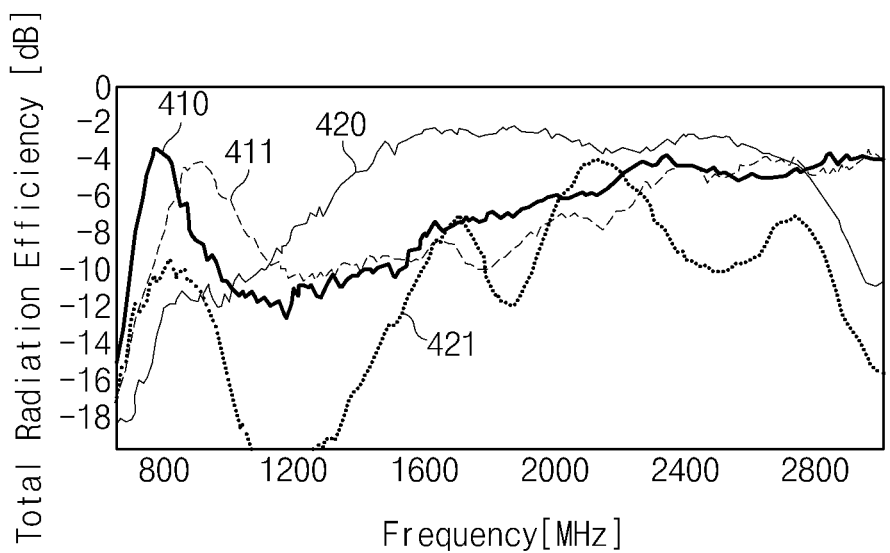
FIG. 4A is a graph illustrating a radiation efficiency change of an antenna according to a short or open state of a second nonconductive member according to an embodiment of the present disclosure.

FIG. 4A is a graph illustrating a radiation efficiency change of an antenna according to a short or open state of a second nonconductive member according to an embodiment of the present disclosure.

Referring to FIG. 4A, the first antenna 201 and the second antenna 202 may be distinguishable from each other with respect to the second nonconductive member 162. A communication circuit (e.g., a communication processor (CP)) in the electronic device 101 may short-circuit or open opposite ends of the second nonconductive member 162 through a separate switching structure. In this case, a radiation efficiency of each antenna may change as the opposite ends of the second nonconductive member 162 are short-circuited or opened.

The first antenna 201 shows a radiation efficiency change of a graph 410 while the opposite ends of the second nonconductive member 162 are opened. The first antenna 201 may transmit and receive a signal of about 800 MHz band, in the low band.

The first antenna 201 shows a radiation efficiency change of a graph 411 while the opposite ends of the second nonconductive member 162 are short-circuited. After the opposite ends of the second nonconductive member 162 are short-circuited, the first antenna 201 may transmit and receive a signal of about 900 MHz band, in the low band.

The second antenna 202 shows a radiation efficiency change of a graph 420 while the opposite ends of the second nonconductive member 162 are opened. The second antenna 202 may transmit and receive a signal of about 1700 MHz band in the middle band and may transmit and receive a signal of about 2400 MHz band in the high band.

The second antenna 202 shows a radiation efficiency change of a graph 421 while the opposite ends of the second nonconductive member 162 are short-circuited. After the opposite ends of the second nonconductive member 162 are short-circuited, the second antenna 202 may transmit and receive a signal of about 2100 MHz band in the middle band and may transmit and receive a signal of about 2700 MHz band in the high band.

The communication circuit in the electronic device 101 may connect and separate the opposite ends of the second nonconductive member 162 through a separate switching structure such that the first antenna 201 and the second antenna 202 operate in various frequency bands. The communication circuit may adjust an impedance matching value such that each antenna transmits and receives a signal of a necessary frequency band.

Figure 4B:
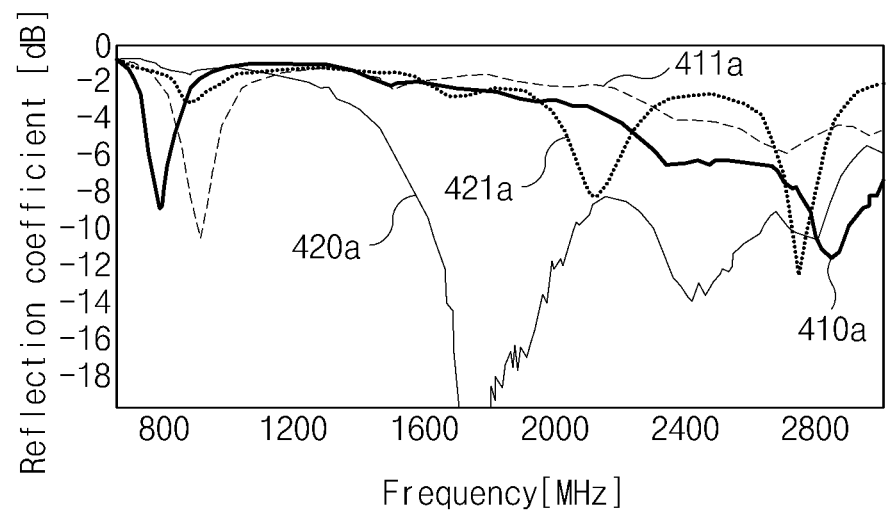
FIG. 4B is a graph illustrating a reflection coefficient change of an antenna according to a short or open state of the second nonconductive member according to an embodiment of the present disclosure.

FIG. 4B is a graph illustrating a reflection coefficient change of an antenna according to a short or open state of a second nonconductive member according to an embodiment of the present disclosure.

Referring to FIG. 4B, the first antenna 201 and the second antenna 202 may be distinguishable from each other with respect to the second nonconductive member 162. The communication circuit in the electronic device 101 may connect or separate opposite ends of the second nonconductive member 162 through a separate switching structure. In this case, a reflection coefficient of each antenna may change as the opposite ends of the second nonconductive member 162 are short-circuited or opened.

The first antenna 201 shows a reflection coefficient change of a graph 410a while the opposite ends of the second nonconductive member 162 are opened. The first antenna 201 shows a reflection coefficient change of a graph 411a while the opposite ends of the second nonconductive member 162 are short-circuited.

The second antenna 202 shows a reflection coefficient change of a graph 420a while the opposite ends of the second nonconductive member 162 are opened. The second antenna 202 shows a reflection coefficient change of a graph 421a while the opposite ends of the second nonconductive member 162 are short-circuited.

Figure 5:
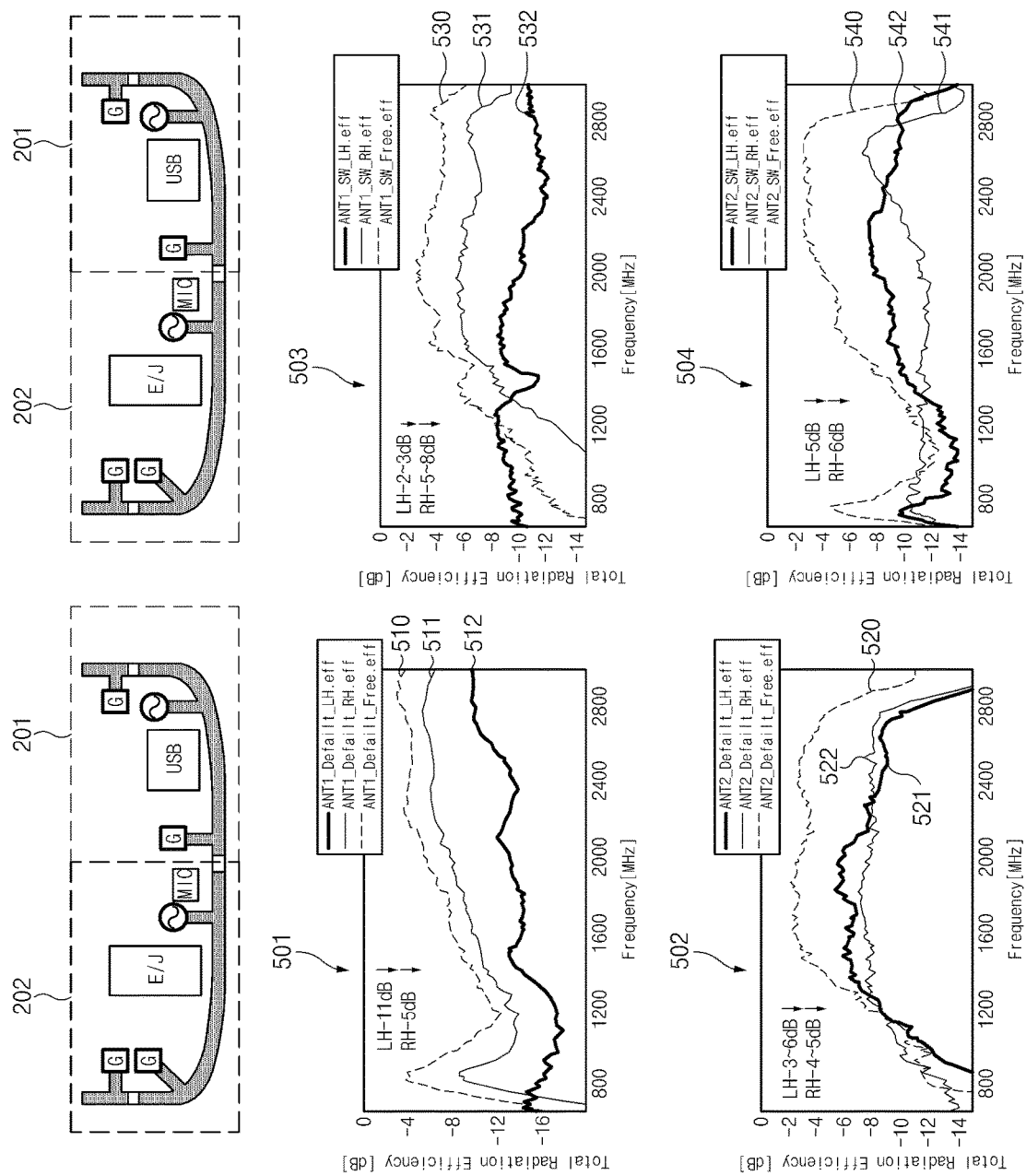
FIG. 5 illustrates a change in a radiation characteristic during user contact with an electronic device, according to an embodiment of the present disclosure.

FIG. 5 illustrates changes in radiation characteristics during user contact with an electronic device, according to an embodiment of the present disclosure.

Referring to FIG. 5, a graph 501 shows a change in radiation efficiency of the first antenna 201 according to a direction in which the user grips the electronic device 101, in a pre-switching state (the state of FIG. 2A).

In the graph 501, before the user grips the electronic device 101, the first antenna 201 shows an operating characteristic of the graph 510. The first antenna 201 may transmit and receive a frequency signal included in the low band (e.g., the 800 MHz band) or the middle band (e.g., the 1500 MHz band).

When the user grips the electronic device 101 in a first direction (e.g., the user grips the electronic device 101 with his/her right hand), the first antenna 201 shows an operating characteristic of a graph 511. When the user grips the electronic device 101 in a second direction (e.g., the user grips the electronic device 101 with his/her left hand), the first antenna 201 shows an operating characteristic of a graph 512. In graph 512, a portion (e.g., a palm), which has a relatively large area, of a user's body may make contact with a radiator of the first antenna 201, and thus, a change in a radiation characteristic may be relatively greater.

A graph 502 shows a change in radiation efficiency of the second antenna 202 according to a direction in which the user grips the electronic device 101, in the pre-switching state.

In the graph 502, before the user grips the electronic device 101, the second antenna 202 shows an operating characteristic of the graph 520. The second antenna 202 may be designed to transmit and receive a signal included in the middle band (e.g., the 1500 MHz band) or the high band (e.g., the 2400 MHz band).

When the user grips the electronic device 101 in a first direction (e.g., the user grips the electronic device 101 with his/her right hand), the second antenna 202 shows an operating characteristic of a graph 521. When the user grips the electronic device 101 in a second direction (e.g., the user grips the electronic device 101 with his/her left hand), the second antenna 202 shows an operating characteristic of a graph 522. A characteristic change of the second antenna 202 according to gripping of the user may be smaller than that of the first antenna 201.

A communication circuit in the electronic device 101 may allow frequency bands of the first antenna 201 and the second antenna 202 to be exchanged through switching.

A graph 503 shows a change in radiation efficiency of the first antenna 201 according to a direction in which the user grips the electronic device 101, in the post-switching state (the state of FIG. 2B). In the graph 503, before the user grips the electronic device 101, the first antenna 201 shows an operating characteristic of the graph 530. The first antenna 201 may be designed to transmit and receive a signal included in the middle band (e.g., the 1500 MHz band) or the high band (e.g., the 2400 MHz band).

When the user grips the electronic device 101 in a first direction (e.g., the user grips the electronic device 101 with his/her right hand), the first antenna 201 shows an operating characteristic of a graph 531. When the user grips the electronic device 101 in a second direction (e.g., the user grips the electronic device 101 with his/her left hand), the first antenna 201 shows an operating characteristic of a graph 532. A characteristic change according to gripping of the user in the case where the first antenna 201 transmits and receives a signal of the middle band or the high band (graph 503) may be greater than in the case where the second antenna 202 transmits and receives a signal of the middle band or the high band (graph 502).

A graph 504 shows a change in radiation efficiency of the second antenna 202 according to a direction in which the user grips the electronic device 101, in the post-switching state (the state of FIG. 2B). In the graph 504, before the user grips the electronic device 101, the second antenna 202 shows an operating characteristic of the graph 540. The second antenna 202 may transmit and receive a frequency signal included in the low band (e.g., the 800 MHz band) or the middle band (e.g., the 1500 MHz band).

When the user grips the electronic device 101 in a first direction (e.g., the user grips the electronic device 101 with his/her right hand), the second antenna 202 shows an operating characteristic of a graph 541. When the user grips the electronic device 101 in a second direction (e.g., the user grips the electronic device 101 with his/her left hand), the second antenna 202 shows an operating characteristic of a graph 542. A characteristic change according to gripping of the user in the case where the second antenna 202 transmits and receives a signal of the low band (graph 504) may be smaller than in the case where the first antenna 201 transmits and receives a signal of the low band (graph 501).

The communication circuit of the electronic device 101 may adjust the corresponding frequency bands in the first antenna 201 and the second antenna 202 in consideration of influence due to user contact. For example, when the radiation performance deteriorates due to user contact while the first antenna 201 receives a signal of the high band (graph 503), the communication circuit may perform switching such that the second antenna 202 transmits and receives a signal of the high band (graph 502), thereby reducing a decrease in radiation performance due to the user contact.

Figure 6:
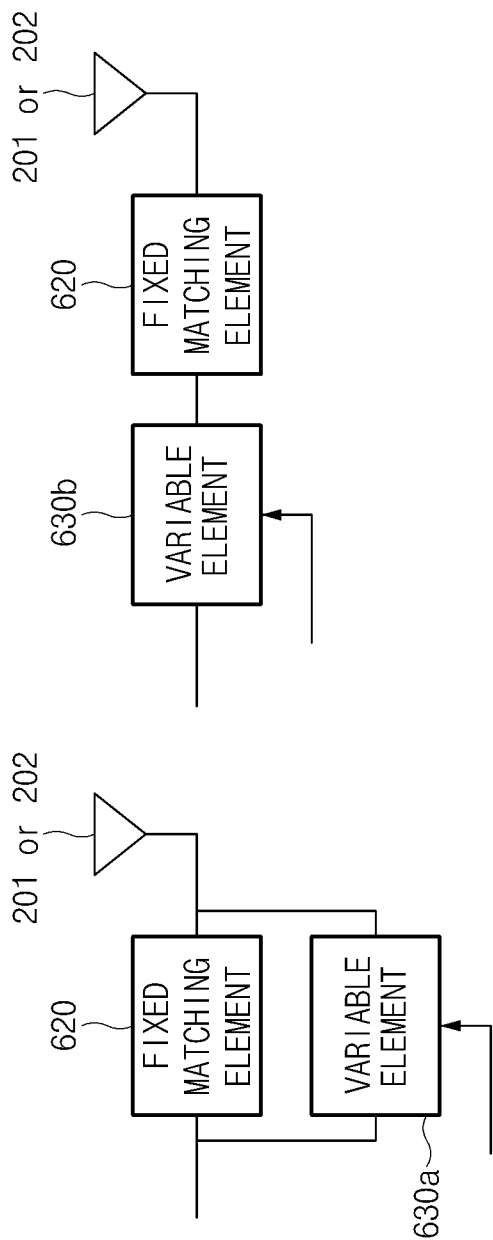
FIG. 6 illustrates a structure for changing a resonant frequency through a change in a matching value, according to an embodiment of the present disclosure.

FIG. 6 illustrates a structure for changing a resonant frequency through a change in a matching value, according to an embodiment of the present disclosure.

Referring to FIG. 6, frequency bands of the first antenna 201 and the second antenna 202 may be changed (or exchanged) through a change in a matching value at an antenna matching stage. Antenna impedance may be changed by using a variable element 630a or 630b (e.g., a variable capacitor) connected in parallel with or in series to a fixed matching element 620 of each antenna having default matching value. A resonance frequency of an antenna may be changed on a case by case basis if a variable value or bypass is used. For example, the variable element 630a or 630b may be implemented with a variable capacitor "C" or a variable inductor "L".

The variable element 630a or 630b may be connected in series to or in parallel with the antenna 201 or 202. In the case of a parallel connection, the variable element 630a may be connected between opposite ends of the fixed matching element (or fixed matching circuit) 620, and a value of the variable element 630a may be adjusted under control of a communication circuit (radio frequency integrated chip (RFIC) or CP). In a serial connection, the variable element 630b may be connected to an internal terminal of the fixed matching element 620.

Figure 7:
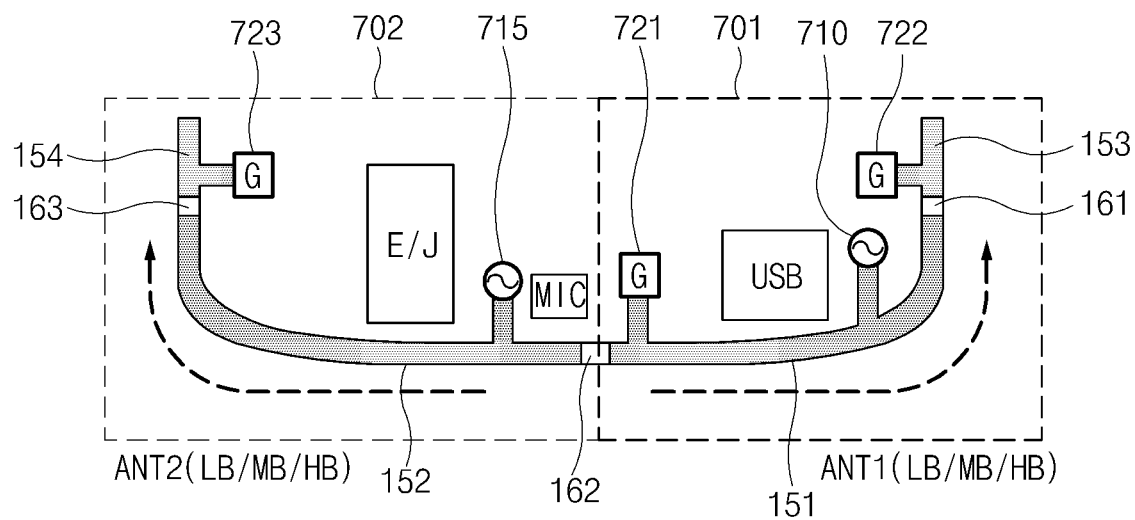
FIG. 7 illustrates first and second antennas having the same or similar patterns, according to an embodiment of the present disclosure.

FIG. 7 illustrates first and second antennas having the same or similar patterns, according to an embodiment of the present disclosure.

Referring to FIG. 7, a first antenna 701 includes the first conductive pattern 151, the third conductive pattern 153, a first feeding part 710, a first ground part 721, and a second ground part 722. The first antenna 701 may transmit and receive a signal of a specified frequency band to and from an external device by using the first conductive pattern 151 and the third conductive pattern 153. Each component of the first antenna 701 may perform a function identical or similar to that of the corresponding component of the first antenna 201 in FIG. 2A.

The first antenna 701 may operate as an IFA, transmitting and receiving a multi-band signal.

The second antenna 702 includes the second conductive pattern 152, the fourth conductive pattern 154, a second feeding part 715, and a third ground part 723. The second antenna 702 may transmit and receive a signal of a specified frequency band to and from the external device by using the second conductive pattern 152 and the fourth conductive pattern 154. The second antenna 702 may differ from the second antenna 202 in FIG. 2A in that the third ground part 233 connected to the second conductive pattern 152 is removed.

The second antenna 702 may operate a monopole antenna to transmit and receive a multi-band signal or a semi inverted F antenna in which a ground is implemented on a board and is connected to a second feeding part.

Figure 8:
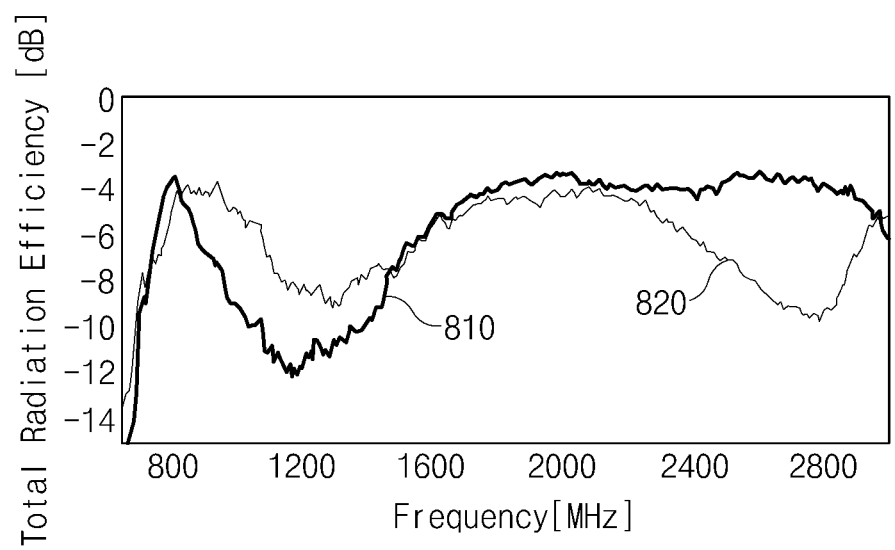
FIG. 8 is a graph illustrating a radiation efficiency of the first antenna and the second antenna of FIG. 7, according to an embodiment of the present disclosure.

FIG. 8 illustrates radiation efficiency of a first antenna and a second antenna of FIG. 7, according to an embodiment of the present disclosure.

Referring to FIG. 8, the first antenna 701 has a radiation characteristic according to a graph 810. The first antenna 701 may be configured to transmit and receive all signals included in the low band (e.g., the 800 MHz band), the middle band (e.g., the 1500 MHz band), and the high band (e.g., the 2400 MHz band).

The second antenna 702 has a radiation characteristic according to a graph 820. Like the first antenna 701, the second antenna 702 may be configured to transmit and receive all signals included in the low band (e.g., the 800 MHz band), the middle band (e.g., the 1500 MHz band), and the high band (e.g., the 2400 MHz band).

The first antenna 701 and the second antenna 702 show different radiation characteristics in some frequency intervals. For example, in a 1200 MHz band, the radiation performance of the second antenna 702 is higher than that of the first antenna 701. In a 2800 MHz band, the radiation performance of the first antenna 701 is higher than that of the second antenna 702.

The communication circuit in the electronic device 101 may selectively use an antenna, the radiation performance of which is relatively high in a specific frequency band, through switching, or may implement a wide band antenna by operating the first antenna 701 and the second antenna 702 at the same time. Also, it may be possible to solve a mutual interference issue and to obtain impedance matching and wide-band effects by using the first antenna 701 and the second antenna 702.

Figure 9A:
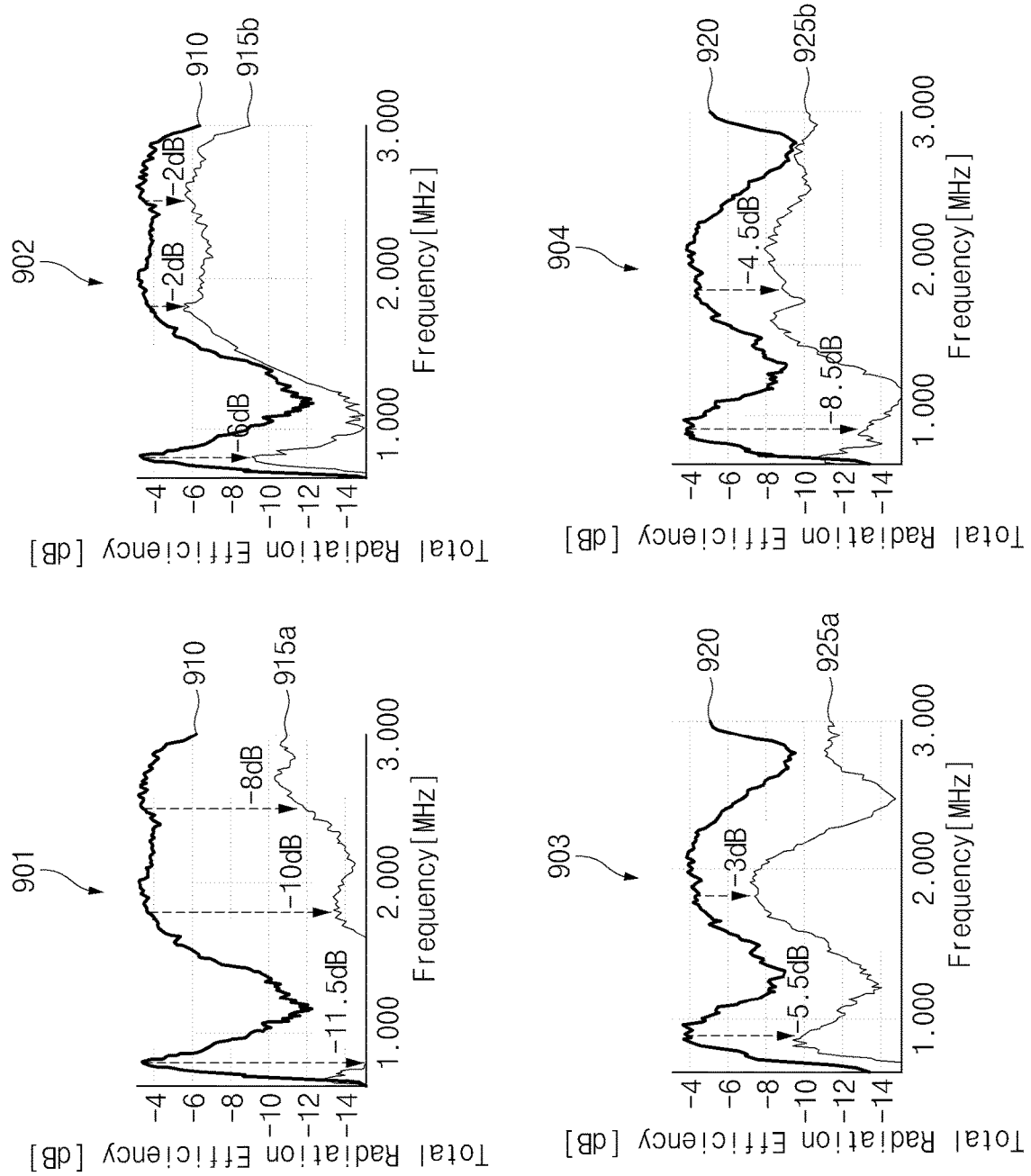
FIG. 9A illustrates changes in radiation characteristics during user contact with an electronic device, according to an embodiment of the present disclosure.

FIG. 9A illustrates changes in radiation characteristics during user contact with an electronic device, according to an embodiment of the present disclosure.

Referring to FIG. 9A, when the user grips a lower portion of an electronic device where the first antenna 701 and the second antenna 702 are disposed, an operating characteristic of each antenna may change with a direction in which the user grips the electronic device.

Graphs 901 and 902 show changes in radiation efficiency of the first antenna 701 according to a direction in which the user grips the electronic device. Before the user grips the electronic device, the first antenna 701 shows an operating characteristic of a graph 910. When the user grips the electronic device 101 in a first direction (e.g., the user grips the electronic device 101 with his/her right hand), the first antenna 701 shows an operating characteristic of a graph 915*a*. When the user grips the electronic device 101 in a second direction (e.g., the user grips the electronic device 101 with his/her left hand), the first antenna 701 shows an operating characteristic of a graph 915*b*. In graph 915*a*, a portion (e.g., a palm), which has a relatively large area, of a user's body may make contact with a radiator of the first antenna 701, and thus, a change in a radiation characteristic may be relatively great.

Graphs 903 and 904 show changes in radiation efficiency of the second antenna 702 according to a direction in which the user grips the electronic device. Before the user grips the electronic device, the second antenna 702 shows an operating characteristic of a graph 920. When the user grips the electronic device 101 in the first direction, the second antenna 702 shows an operating characteristic of a graph 925*a*. When the user grips the electronic device 101 in the second direction, the second antenna 702 shows an operating characteristic of a graph 925*b*. In graph 925*a*, a portion (e.g., a palm), which has a relatively large area, of a user's body may make contact with a radiator of the second antenna 702, and thus, a change in a radiation characteristic may be relatively great.

The communication circuit in the electronic device 101 may selectively use the first antenna 701 and the second antenna 702 in consideration of influence due to user contact. For example, when the user grips the electronic device 101 in the first direction, the communication circuit may operate the second antenna 702, on which the gripping of the user has a relatively small influence and may limit an operation of the first antenna 701. As another example, when the user grips the electronic device 101 in the second direction, the communication circuit may operate the first antenna 701, on which the gripping of the user has a relatively small influence and may limit an operation of the second antenna 702.

Figure 9B:
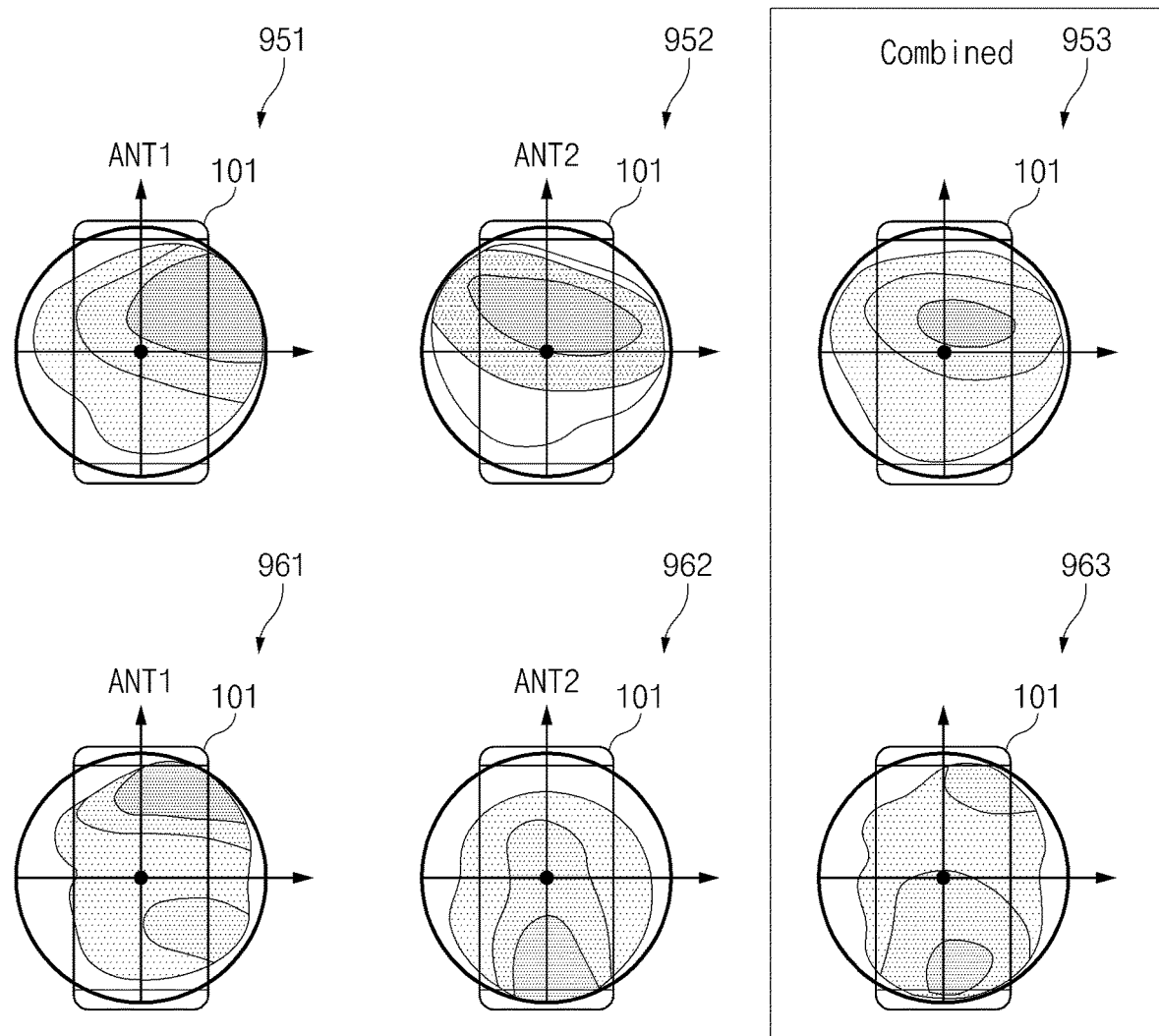
FIG. 9B illustrates coverage changes due to a simultaneous operation of first and second antennas according to an embodiment of the present disclosure.

FIG. 9B illustrates coverage changes due to simultaneous operation of the first and second antennas according to an embodiment of the present disclosure.

Referring to FIG. 9B, when simultaneously operating the first antenna 201/701 and the second antenna 202/702, a coverage of the corresponding frequency band signal may be expanded.

For a first band (e.g., the low band), the first antenna 201/701 may receive a frequency signal of a first range 951, and the second antenna 202/702 may transmit and receive a frequency signal of a second range 952. The electronic device 101 may receive a third range 953 corresponding to a sum of the first range 951 and the second range 952 in the first band. A coverage of the third range 953 may be greater than a coverage of each of the first range 951 and the second range 952.

For a second band (e.g., the middle band), the first antenna 201/701 may receive a frequency signal of a first range 961, and the second antenna 202/702 may transmit and receive a frequency signal of a second range 962. The electronic device 101 may receive a third range 963 corresponding to a sum of the first range 961 and the second range 962 in the second band. A coverage of the third range 963 may be greater than a coverage of each of the first range 961 and the second range 962.

The first antenna 201/701 and the second antenna 202/702 may mutually complement beam patterns biased in one direction, thereby securing a wide coverage. Accordingly, it may be possible to distribute a hot spot being a point through which signals are transmitted and received often and to prevent a temperature from increasing at a specific portion of a radiator. Also, it may be possible to reduce the SAR influencing the user.

Figure 10:
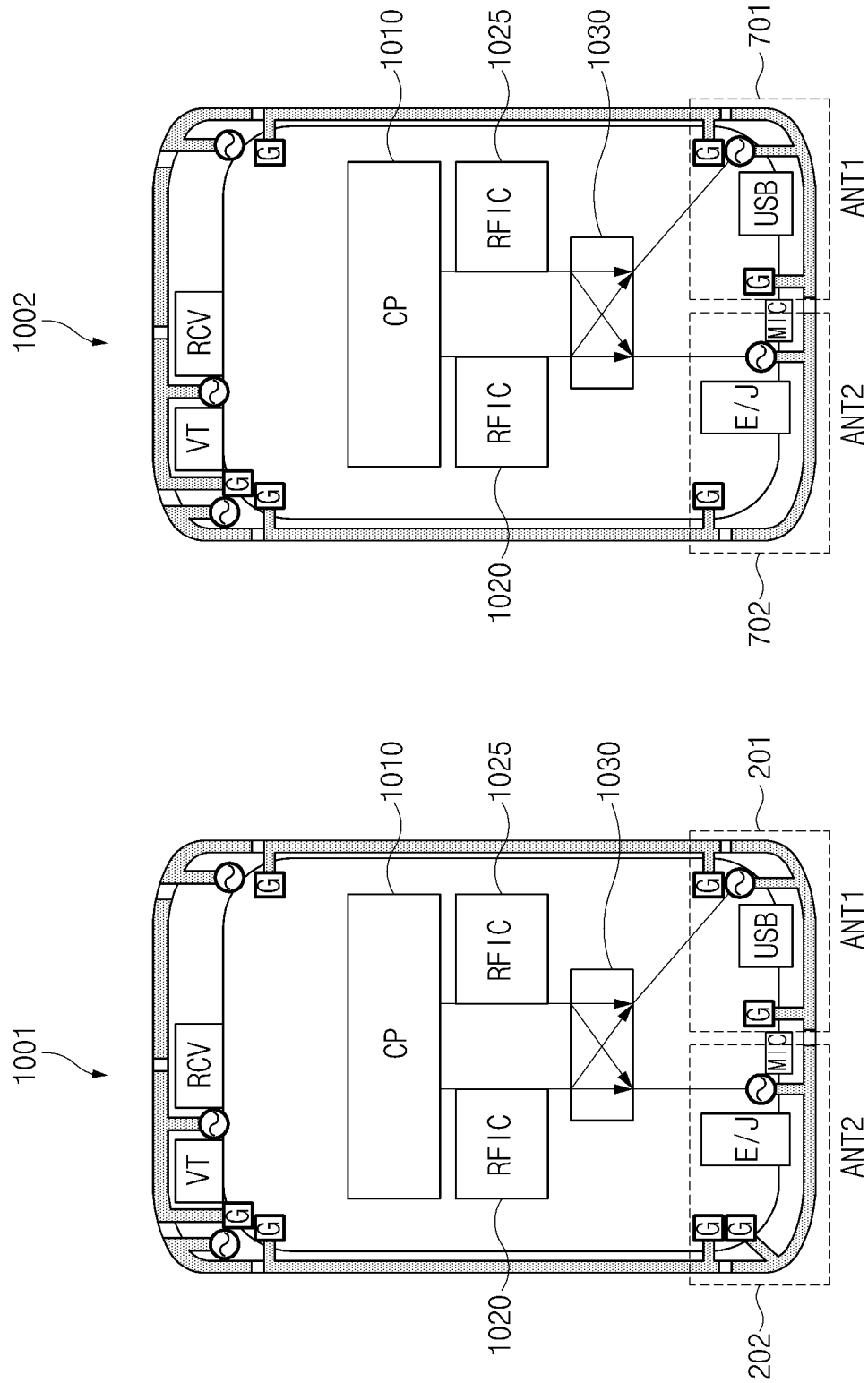
FIG. 10 illustrates a first antenna and a second antenna being controlled using a switching structure, according to an embodiment of the present disclosure.

FIG. 10 illustrates a first antenna and a second antenna being controlled using a switching structure, according to an embodiment of the present disclosure.

Referring to FIG. 10, an electronic device 1001 includes the first antenna 201, the second antenna 202, a CP 1010, a first communication circuit (e.g., RFIC) 1020, a second communication circuit (e.g., RFIC) 1025, and a switching structure 1030. An electronic device 1002 includes the first antenna 701, the second antenna 702, the CP 1010, the first communication circuit 1020, the second communication circuit 1025, and the switching structure 1030.

The communication processor 1010 is connected to the first communication circuit 1020 and the second communication circuit 1025 and transmits a control signal.

The first communication circuit 1020 and the second communication circuit 1025 may be connected to a feeding part of the first antenna 201 or a feeding part of the second antenna 202 through the switching structure 1030. That is, the switching structure 1030 may connect one of the first communication circuit 1020 and the second communication circuit 1025 to the feeding part of the first antenna 201 and may connect the other thereof to the feeding part of the second antenna 202.

The communication processor 1010 may control the switching structure 1030 to exchange bands of signals transmitted and received through the first antenna 201 and the second antenna 202. For example, the first communication circuit 1020 may process a signal of the low band or the middle band, and the second communication circuit 1025 may process a signal of the middle band or the high band. When the feeding part of the first antenna 201 is connected to the first communication circuit 1020 and the feeding part of the second antenna 202 is connected to the second communication circuit 1025, the communication processor 1010 may control the switching structure 1030 such that the feeding part of the first antenna 201 is connected to the second communication circuit 1025 and the feeding part of the second antenna 202 is connected to the first communication circuit 1020

For example, the communication processor 1010 may control the switching structure 1030 to use the first antenna 201 and/or the second antenna 202 based on peripheral communication conditions of the electronic device 1001/1002, a frequency band of a transmit/receive signal, whether a user makes contact with the electronic device 1001/1002, and/or the communication performance of each antenna.

Figure 11:
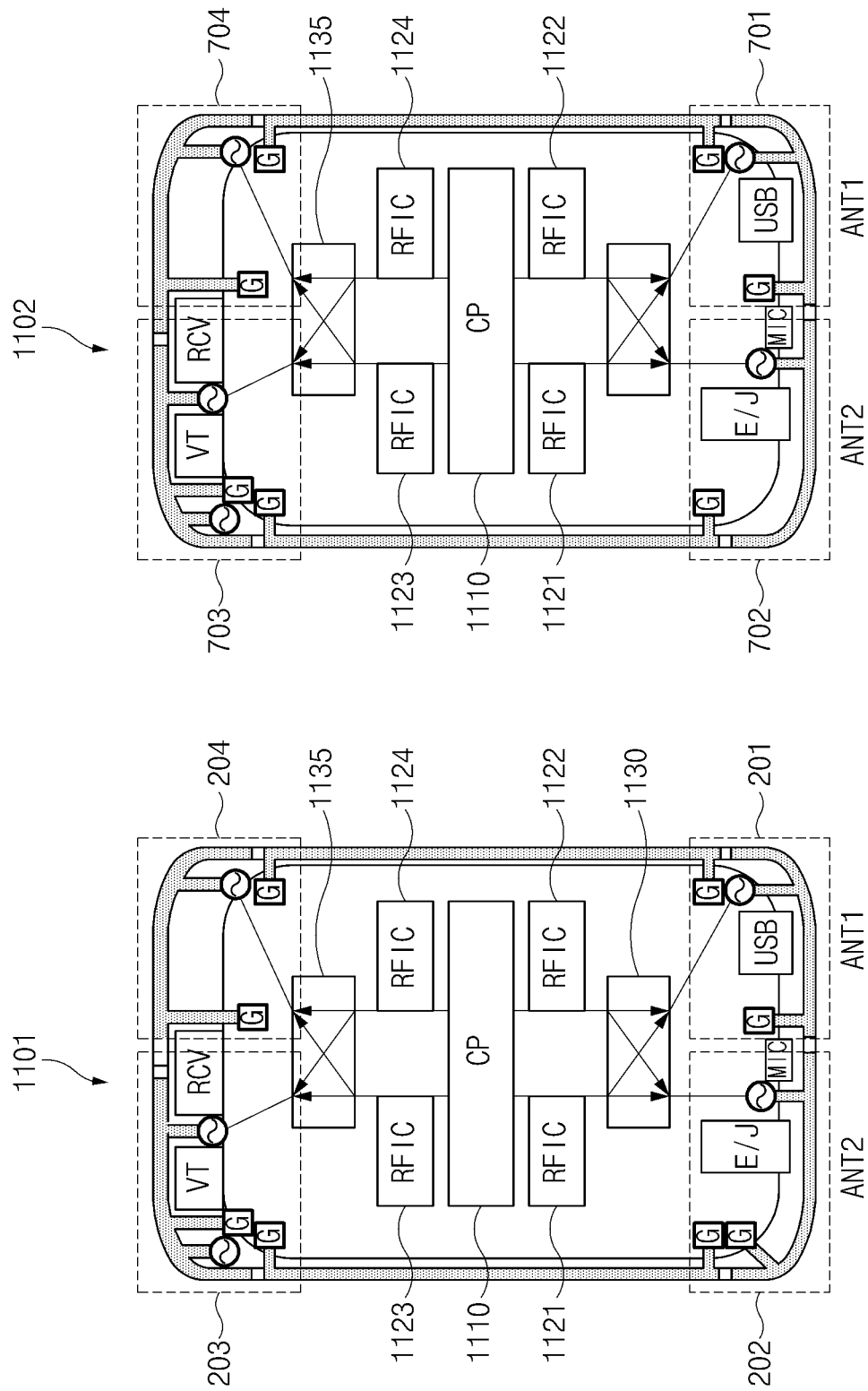
FIG. 11 illustrates a shape in which a plurality of multi-band frequencies are implemented in a first direction and a second direction of an electronic device according to an embodiment of the present disclosure.

FIG. 11 illustrates a shape in which a plurality of multi-band frequencies are implemented in a first direction and a second direction of an electronic device according to an embodiment of the present disclosure.

Referring to FIG. 11, an electronic device 1101 includes the first antenna 201, the second antenna 202, a third antenna 203, a fourth antenna 204, a CP 1110, first to fourth communication circuits 1121 to 1124, and first and second switching structures 1130 and 1135. The first antenna 201 and the second antenna 202 may be formed in a first direction (a direction of a lower end of a side surface of the electronic device 1101), and the third antenna 203 and the fourth antenna 204 may be formed in a second direction (a direction of an upper end of the side surface of the electronic device 1101) opposite to the first direction.

An electronic device 1102 includes the first antenna 701, the second antenna 702, a third antenna 703, a fourth antenna 704, the CP 1110, the first to fourth communication circuits 1121 to 1124, and the first and second switching structures 1130 and 1135. The first antenna 701 and the second antenna 702 may be formed in the first direction, and the third antenna 703 and the fourth antenna 704 may be formed in the second direction opposite to the first direction.

For example, the communication processor 1110 may control the first and second switching structures 1130 and 1135 to use all or part of the first to fourth antennas 201 to 204 and 701 to 704 based on: a peripheral communication conditions of the electronic device 1101/1102, a frequency band of a transmit/receive signal, whether a user makes contact with the electronic device 1001/1002, and the communication performance of each antenna.

Figure 12:
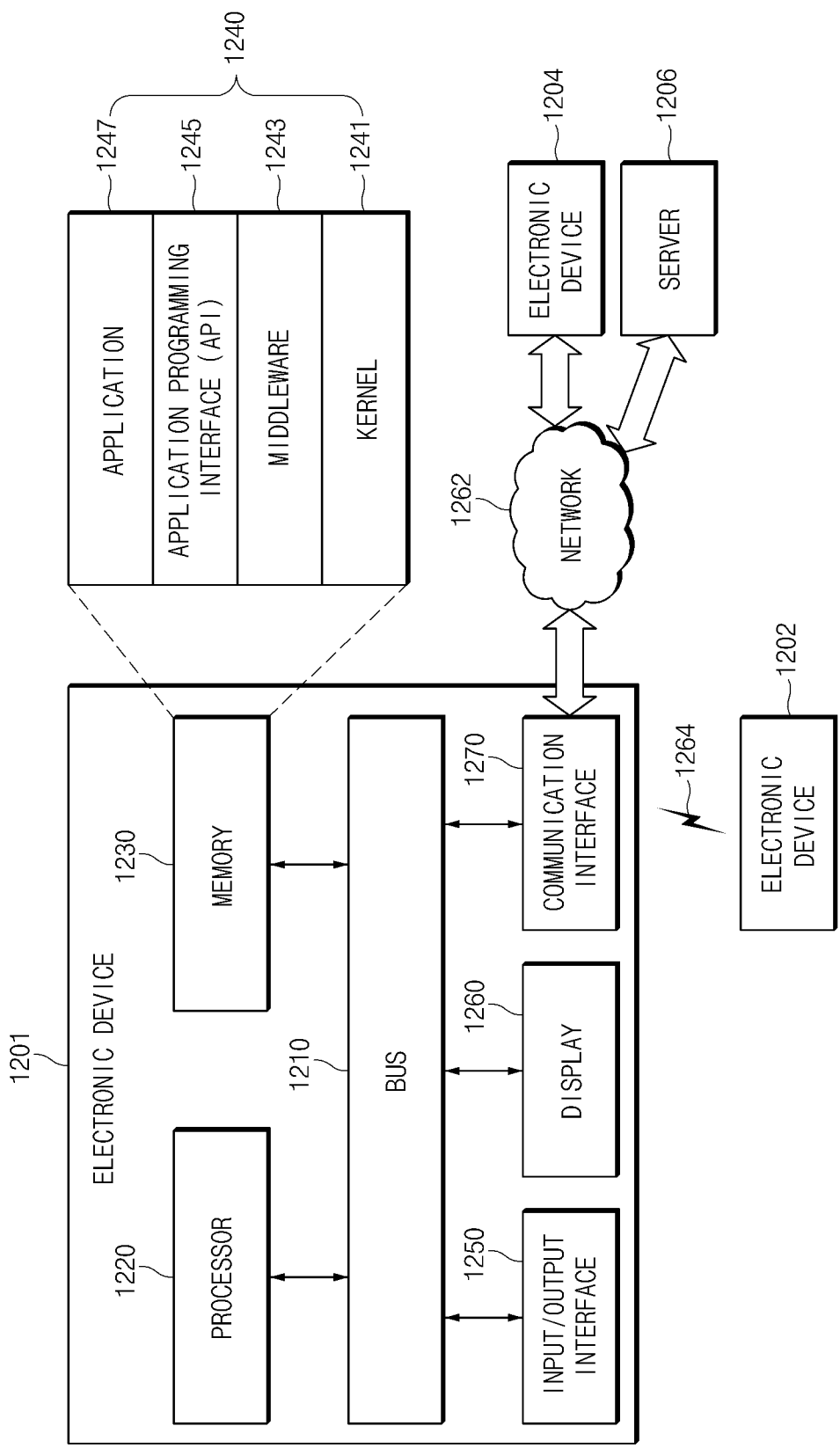
FIG. 12 illustrates an electronic device in a network environment according to an embodiment of the present disclosure.

FIG. 12 illustrates an electronic device in a network environment according to an embodiment of the present disclosure.

Referring to FIG. 12, the electronic device 1201 includes a bus 1210, a processor 1220, a memory 1230, an input/output interface 1250, a display 1260, and a communication interface 1270. Alternatively, at least one of the foregoing elements may be omitted and/or another element may be added to the electronic device 1201.

The bus 1210 may include a circuit for connecting the above-mentioned elements 1210 to 1270 to each other and transferring communications (e.g., control messages and/or data) among the other elements.

The processor 1220 may include at least one of a CPU, an AP, or a CP. The processor 1220 may perform data processing or an operation related to communication and/or control of at least one of the other elements of the electronic device 1201.

The memory 1230 may include a volatile memory and/or a nonvolatile memory. The memory 1230 may store instructions or data related to at least one of the other elements of the electronic device 1201. The memory 1230 stores software and/or a program 1240. The program 1240 includes a kernel 1241, a middleware 1243, an application programming interface (API) 1245, and an application program (or an application) 1247. At least a portion of the kernel 1241, the middleware 1243, or the API 1245 may be referred to as an operating system (OS).

The kernel 1241 may control or manage system resources (e.g., the bus 1210, the processor 1220, the memory 1230, etc.) used to perform operations or functions of other programs (e.g., the middleware 1243, the API 1245, or the application program 1247). Further, the kernel 1241 may provide an interface for the middleware 1243, the API 1245, or the application program 1247 to access individual elements of the electronic device 1201, in order to control or manage the system resources.

The middleware 1243 may serve as an intermediary for the API 1245 or the application program 1247 to communicate and exchange data with the kernel 1241.

Further, the middleware 1243 may handle one or more task requests received from the application program 1247 according to a priority order. For example, the middleware 1243 may assign the application program 1247 a priority for using the system resources (e.g., the bus 1210, the processor 1220, the memory 1230, etc.) of the electronic device 1201. The middleware 1243 may handle the one or more task requests according to the priority assigned to the at least one application, thereby performing scheduling or load balancing with respect to the one or more task requests.

The API 1245, which is an interface for allowing the application 1247 to control a function provided by the kernel 1241 or the middleware 1243, may include at least one interface or function (e.g., instructions) for file control, window control, image processing, character control, etc.

The input/output interface 1250 may transfer an instruction or data input from a user or another external device to (an)other element(s) of the electronic device 1201. Further, the input/output interface 1250 may output instructions or data received from (an)other element(s) of the electronic device 1201 to the user or another external device.

The display 1260 may include a liquid crystal display (LCD), a light-emitting diode (LED) display, an organic light-emitting diode (OLED) display, a microelectromechanical systems (MEMS) display, and/or an electronic paper display. The display 1260 may present various content (e.g., a text, an image, a video, an icon, a symbol, etc.) to the user. The display 1260 may also include a touch screen, which receives a touch, gesture, proximity, and/or hovering input from an electronic pen or a part of a body of the user.

The communication interface 1270 may set communications between the electronic device 1201 and a first external electronic device 1202, a second external electronic device 1204, and/or a server 1206. For example, the communication interface 1270 may be connected to a network 1262 via wireless communications or wired communications in order to communicate with the second external electronic device 1204 or the server 1206.

The wireless communications may utilize at least one of cellular communication protocols, such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications also include a short-range communications 1264, such as Wi-Fi, Bluetooth, NFC, magnetic stripe transmission (MST), and/or GNSS.

The MST may generate pulses according to transmission data and the pulses may generate electromagnetic signals. The electronic device 1201 may transmit the electromagnetic signals to a reader device, such as a POS device. The POS device may detect the magnetic signals by using an MST reader and restore data by converting the detected electromagnetic signals into electrical signals.

The GNSS may include at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), and plain old telephone service (POTS). The network 1262 may include a telecommunications network, such as a computer network (e.g., a local area network (LAN) or a wide area network (WAN)), the Internet, or a telephone network.

The types of the first external electronic device 1202 and the second external electronic device 1204 may be the same as or different from the type of the electronic device 1201.

The server 1206 may include a group of one or more servers.

A portion or all of operations performed in the electronic device 1201 may be performed in the first electronic device 1202, the second external electronic device 1204, and/or the server 1206. For example, when the electronic device 1201 should perform a certain function or service, the electronic device 1201 may request at least a portion of the functions related to the function or service from the first electronic device 1202, the second external electronic device 1204, and/or the server 1206, instead of or in addition to performing the function or service for itself. The first electronic device 1202, the second external electronic device 1204, and/or the server 1206 may perform the requested function or additional function, and may transfer a result of the performance to the electronic device 1201. The electronic device 1201 may use a received result itself or additionally process the received result to provide the requested function or service. To this end, a cloud computing technology, a distributed computing technology, or a client-server computing technology may be used.

Figure 13:
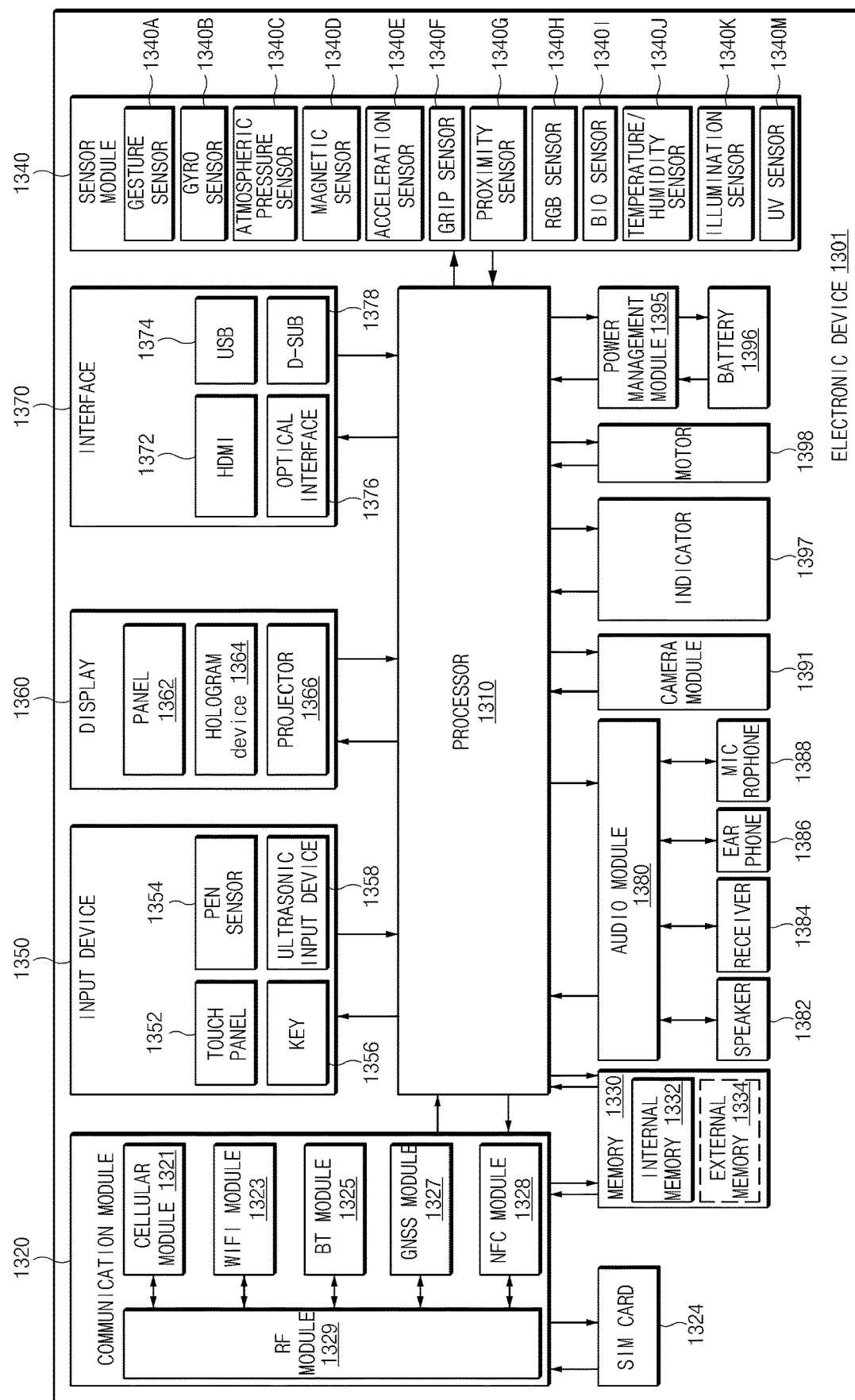
FIG. 13 illustrates an electronic device according to an embodiment of the present disclosure.

FIG. 13 illustrates an electronic device according to an embodiment of the present disclosure.

Referring to FIG. 13, the electronic device 1301 includes a processor (e.g., an AP) 1310, a communication module 1320, a subscriber identification module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may run an OS or an application program to control a plurality of hardware or software elements connected to the processor 1310, and may process various data and perform various operations. The processor 1310 may be implemented with a system on chip (SoC). The processor 1310 may further include a graphic processing unit (GPU) and/or an image signal processor. The processor 1310 may include at least a portion (e.g., a cellular module 1321) of the elements illustrated in FIG. 13. The processor 1310 may load, on a volatile memory, an instruction or data received from at least one of other elements (e.g., a nonvolatile memory) to process the instruction or data, and may store various data in a nonvolatile memory.

The communication module 1320 includes the cellular module 1321, a Wi-Fi module 1323, a Bluetooth (BT) module 1325, a GNSS module 1327 (e.g., a GPS module, a GLONASS module, a BeiDou module, or a Galileo module), an NFC module 1328, and a radio frequency (RF) module 1329.

The cellular module 1321 may provide a voice call service, a video call service, a text message service, and/or an Internet service through a communication network. The cellular module 1321 may identify and authenticate the electronic device 1301 in the communication network using the SIM card 1324. The cellular module 1321 may perform at least a part of functions that may be provided by the processor 1310. The cellular module 1321 may include a CP.

Each of the Wi-Fi module 1323, the Bluetooth module 1325, the GNSS module 1327 and the NFC module 1328 may include a processor for processing data transmitted/received through the modules. At least a part (e.g., two or more) of the cellular module 1321, the Wi-Fi module 1323, the Bluetooth module 1325, the GNSS module 1327, and the NFC module 1328 may be included in a single integrated chip (IC) or IC package.

The RF module 1329 may transmit/receive communication signals (e.g., RF signals). The RF module 1329 may include a transceiver, a power amp module (PAM), a frequency filter, a low noise amplifier (LNA), an antenna, etc. At least one of the cellular module 1321, the Wi-Fi module 1323, the Bluetooth module 1325, the GNSS module 1327, or the NFC module 1328 may transmit/receive RF signals through a separate RF module.

The SIM card 1324 may include an embedded SIM card and/or a card containing the SIM, and may include unique identification information (e.g., an integrated circuit card identifier (ICCID)) or subscriber information (e.g., international mobile subscriber identity (IMSI)).

The memory 1330 includes an internal memory 1332 and an external memory 1334. The internal memory 1332 may include at least one of a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.)), a hard drive, or a solid state drive (SSD).

The external memory 1334 may include a flash drive such as a compact flash (CF), a secure digital (SD), a Micro-SD, a Mini-SD, an extreme digital (xD), a MultiMediaCard (MMC), a memory stick, etc. The external memory 1334 may be operatively and/or physically connected to the electronic device 1301 through various interfaces.

The sensor module 1340 may measure physical quantity or detect an operation state of the electronic device 1301 in order to convert measured or detected information into an electrical signal. The sensor module 1340 includes a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (e.g., a red/green/blue (RGB) sensor), a biometric (bio) sensor 1340I, a temperature/humidity sensor 1340J, an illumination sensor 1340K, and an ultraviolet (UV) sensor 1340M.

Additionally or alternatively, the sensor module 1340 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor.

The sensor module 1340 may further include a control circuit for controlling at least one sensor included therein. The electronic device 1301 may further include a processor configured to control the sensor module 1340 as a part of the processor 1310 or separately, so that the sensor module 1340 is controlled while the processor 1310 is in a sleep state.

The input device 1350 includes a touch panel 1352, a (digital) pen sensor 1354, a key 1356, and an ultrasonic input device 1358. The touch panel 1352 may employ at least one of capacitive, resistive, infrared, and ultraviolet sensing methods. The touch panel 1352 may further include a control circuit. The touch panel 1352 may further include a tactile layer that provides haptic feedback to a user.

The (digital) pen sensor 1354 may include a sheet for recognition, which is a part of a touch panel or is separate.

The key 1356 may include a physical button, an optical button, and/or a keypad.

The ultrasonic input device 1358 may sense ultrasonic waves generated by an input tool through a microphone 1388 in order to identify data corresponding to the ultrasonic waves sensed.

The display 1360 includes a panel 1362, a hologram device 1364, and a projector 1366. The panel 1362 may be flexible, transparent, and/or wearable. The panel 1362 and the touch panel 1352 may be integrated into a single module.

The hologram device 1364 may display a stereoscopic image in a space using a light interference phenomenon.

The projector 1366 may project light onto a screen in order to display an image. The screen may be disposed in the inside or the outside of the electronic device 1301.

The display 1360 may also include a control circuit for controlling the panel 1362, the hologram device 1364, and/or the projector 1366.

The interface 1370 includes an HDMI 1372, a USB 1374, an optical interface 1376, and a D-subminiature (D-sub) 1378.

Additionally or alternatively, the interface 1370 may include, a mobile high-definition link (MHL) interface, an SD card/multi-media card (MMC) interface, and/or an infrared data association (IrDA) interface.

The audio module 1380 may convert a sound into an electrical signal or vice versa. The audio module 1380 may process sound information input or output through a speaker 1382, a receiver 1384, an earphone 1386, and/or the microphone 1388.

The camera module 1391 shoots a still image and/or a video. The camera module 1391 may include at least one image sensor (e.g., a front sensor or a rear sensor), a lens, an image signal processor (ISP), and/or a flash (e.g., an LED or a xenon lamp).

The power management module 1395 may manage power of the electronic device 1301. The power management module 1395 may include a power management integrated circuit (PMIC), a charger integrated circuit (IC), and/or a battery gauge.

The PMIC may employ a wired and/or wireless charging method. The wireless charging method may include a magnetic resonance method, a magnetic induction method, an electromagnetic method, etc. An additional circuit for wireless charging, such as a coil loop, a resonant circuit, a rectifier, etc., may be further included.

The battery gauge may measure a remaining capacity of the battery 1396 and a voltage, current, and/or temperature thereof while the battery is charged.

The battery 1396 may include a rechargeable battery and/or a solar battery.

The indicator 1397 may display a specific state of the electronic device 1301 or a part thereof (e.g., the processor 1310), such as a booting state, a message state, a charging state, etc.

The motor 1398 may convert an electrical signal into a mechanical vibration, and may generate a vibration or haptic effect.

Although not illustrated, a processing device (e.g., a GPU) for supporting a mobile TV may be included in the electronic device 1301. The processing device for supporting a mobile TV may process media data according to the standards of digital multimedia broadcasting (DMB), digital video broadcasting (DVB), MediaFLO™, etc.

According to an embodiment, an electronic device includes a housing surrounding the electronic device, a conductive member forming at least a part of the housing, first to third nonconductive members separating the conductive member, a plurality of feeding parts and a plurality of ground parts connected to the conductive member, and a communication circuit electrically connected with the conductive member, wherein the conductive member includes a first conductive pattern disposed between the first nonconductive member and the second nonconductive member and a second conductive pattern disposed between the second nonconductive member and the third nonconductive member, wherein a first feeding part of the plurality of feeding parts is connected to the first conductive pattern and a second feeding part of the plurality of feeding parts is connected to the second conductive pattern, and wherein a first ground part of the plurality of ground parts is connected to the first conductive pattern at a point adjacent to the second nonconductive member.

The first nonconductive member is disposed to face a first direction, wherein the third nonconductive member is disposed to face a second direction opposite to the first direction, and wherein the second nonconductive member is disposed to face a third direction perpendicular to the first direction or the second direction.

A distance between the first nonconductive member and the second nonconductive member is substantially the same as a distance between the third nonconductive member and the second nonconductive member.

The conductive member is separated into the first conductive pattern and a third conductive pattern with respect to the first nonconductive member, and a second ground part of the plurality of ground parts is connected to the third conductive pattern. The second ground part is adjacent to the first nonconductive member and is connected to the third conductive pattern.

The conductive member is separated into the second conductive pattern and a fourth conductive pattern with respect to the third nonconductive member, wherein a third ground part of the plurality of ground parts is connected to the second conductive pattern, and wherein a fourth ground part of the plurality of ground parts is connected to the fourth conductive pattern.

The third ground part is adjacent to the third nonconductive member and is connected to the second conductive pattern, and the fourth ground part is adjacent to the third nonconductive member and is connected to the fourth conductive pattern.

The communication circuit includes a first communication circuit and a second communication circuit, wherein the first feeding part is connected to one of the first communication circuit and the second communication circuit through switching, and wherein the second feeding part is connected to the other of the first communication circuit and the second communication circuit through switching.

The first communication circuit and the second communication circuit are implemented with one chip or an integrated circuit.

The first conductive pattern and the first feeding part constitute a first antenna transmitting and receiving a multi-band frequency signal, and the second conductive pattern and the second feeding part constitute a second antenna transmitting and receiving a multi-band frequency signal.

The first antenna transmits and receives a signal of a first frequency band, and the second antenna transmits and receives a signal of a second frequency band, at least a part of which is common to the first frequency band.

The first antenna transmits and receives a signal of the second frequency band by switching, and the second antenna transmits and receives a signal of the first frequency band.

The first antenna operates as an IFA, and the second antenna operates as a loop antenna.

The first antenna operates as an IFA, and the second antenna operates a semi-inverted F antenna.

The first ground part is connected to the first conductive pattern within a first distance range from the second nonconductive member.

The electronic device further includes fourth to sixth nonconductive members separating the conductive member, wherein the conductive member includes a third conductive pattern disposed between the third nonconductive member and the fourth nonconductive member, a fourth conductive pattern disposed between the fourth nonconductive member and the fifth nonconductive member, a fifth conductive pattern disposed between the fifth nonconductive member and the sixth nonconductive member, and a sixth conductive pattern disposed between the sixth nonconductive member and the first nonconductive member, wherein a third feeding part of the plurality of feeding parts is connected to the fourth conductive pattern and a fourth feeding part of the plurality of feeding parts is connected to the fifth conductive pattern, and wherein a second ground part of the plurality of ground parts is connected to the fourth conductive pattern at a point adjacent to the fifth nonconductive member.

According to an embodiment, an electronic device includes a display, a housing including a first surface including the display, a second surface opposite to the first surface, and a side surface disposed between the first surface and the second surface and a first communication circuit and a second communication circuit, wherein the side surface includes a first conductive pattern, a second conductive pattern, a first nonconductive member, a second nonconductive member, and a third nonconductive member, wherein the first conductive pattern is disposed between the first nonconductive member and the second nonconductive member, wherein the second conductive pattern is disposed between the second nonconductive member and the third nonconductive member, wherein the first conductive pattern is connected to the first communication circuit through a first feeding part, wherein the second conductive pattern is connected to the second communication circuit through a second feeding part, and wherein the second conductive pattern is connected with a ground part at a point spaced apart from the second nonconductive member by a preset distance for isolation of the first conductive pattern.

The first conductive pattern and the first feeding part constitute a first antenna transmitting and receiving a multi-band frequency signal, and the second conductive pattern and the second feeding part constitute a second antenna transmitting and receiving a multi-band frequency signal.

The first antenna transmits and receives a signal of a first frequency band, and the second antenna transmits and receives a signal of a second frequency band, at least a part of which is common to the first frequency band.

The first antenna transmits and receives a signal of the second frequency band by switching, and the second antenna transmits and receives a signal of the first frequency band.

Each of the elements described herein may be configured with one or more components, and the names of the elements may be changed according to the type of an electronic device. In accordance with an embodiment of the present disclosure, an electronic device may include at least one of the elements described herein, and some elements may be omitted or other additional elements may be added. Further, some of the elements of the electronic device may be combined with each other so as to form one entity, so that the functions of the elements may be performed in the same manner as before the combination.

Herein, the term "module" may represent, for example, a unit including one of hardware, software and firmware or a combination thereof. The term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may be implemented mechanically or electronically. For example, a "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to the above-described embodiments of the present disclosure may be implemented as instructions stored in a computer-readable storage medium in the form of a program module. When the instructions are performed by a processor (e.g., the processor 1220), the processor may perform functions corresponding to the instructions. The computer-readable storage medium may be, for example, the memory 1230.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, etc.). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to an embodiment of the present disclosure may include at least one of the above-described elements, or some elements may be omitted or other additional elements may be added. Operations performed by the module, the program module or other elements according to various embodiments of the present disclosure may be performed in a sequential, parallel, iterative, or heuristic way. Further, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:
1. An electronic device, comprising:
a display;
a housing including a first surface on which at least a portion of the display is placed, a second surface opposite to the first surface, and first to fourth side surfaces disposed between the first surface and the second surface;
a first conductive portion, a second conductive portion and a third conductive portion forming the first to third side surfaces;
a first nonconductive member exposed through the first side surface;

a second nonconductive member exposed through the second side surface perpendicular to the first side surface;

a third nonconductive member exposed through the third side surface opposite to the first side surface;

a first ground part electrically connected to the second conductive portion at a point adjacent to the third nonconductive member;

a second ground part electrically connected to the third conductive portion at a point adjacent to the third nonconductive member; and a communication circuit electrically connected with at least one of the first conductive portion, the second conductive portion and the third conductive portion, wherein the first conductive portion forms a first part of the first side surface and a first part of the second side surface, wherein the second conductive portion forms at a second part of the second side surface and a first part of the third side surface, and wherein the third conductive portion forms a second part of the third side surface.

2. The electronic device of claim 1, wherein the first ground part and the second ground part face the second surface.

3. The electronic device of claim 1, further comprising a printed circuit board (PCB), wherein the second ground part is electrically connected to the PCB.

4. The electronic device of claim 1, wherein the first ground part is connected to the first part of the third side surface.

5. The electronic device of claim 1, wherein the second ground part is connected to the second part of the third side surface.

6. The electronic device of claim 1, further comprising at least one of extra nonconductive member exposed through the second side surface and separating the first conductive portion or the third conductive portion.

7. The electronic device of claim 1, further comprising a first feeding part connected to the first conductive portion and a second feeding part connected to the second conductive portion.

8. The electronic device of claim 7, wherein the communication circuit comprises:

a first communication circuit; and a second communication circuit, wherein the first feeding part is connected to one of the first communication circuit and the second communication circuit through switching, and wherein the second feeding part is connected to the other of the first communication circuit and the second communication circuit through switching.

9. The electronic device of claim 8, further comprising one chip or an integrated circuit including the first communication circuit and the second communication circuit.

10. The electronic device of claim 1, wherein the first conductive portion operates as a first antenna transmitting and receiving a multi-band frequency signal, and wherein the second conductive portion operates as a second antenna transmitting and receiving a multi-band frequency signal.

11. The electronic device of claim 10, wherein the first antenna transmits and receives signal through a first frequency band, and wherein the second antenna transmits and receives signal through a second frequency band, at least a part of the second frequency band is common to the first frequency band.

12. The electronic device of claim 11, wherein the first antenna transmits and receives a signal through the second frequency band by switching, and wherein the second antenna transmits and receives a signal through the first frequency band.

13. The electronic device of claim 11, wherein the first antenna comprises an inverted F antenna (IFA), and wherein the second antenna comprises a loop antenna.

14. The electronic device of claim 11, wherein the first antenna comprises an inverted F antenna (IFA), and wherein the second antenna comprises a semi-inverted F antenna.

15. The electronic device of claim 1, wherein the first ground part is connected to the first conductive portion within a first distance from the second nonconductive member.

16. The electronic device of claim 1, further comprising at least one of speaker holes and a USB connector, wherein the at least one of the speaker holes and the USB connector are disposed on the second side surface.

17. An electronic device, comprising:

a display;

a housing including a first surface on which at least a portion of the display is placed, a second surface opposite to the first surface, and first to fourth side surfaces disposed between the first surface and the second surface;

a first conductive portion, a second conductive portion and a third conductive portion forming the first to third side surfaces;

a first nonconductive member is exposed through the first side surface;

a second nonconductive member is exposed through the second side surface perpendicular to the first side surface;

a third nonconductive member is exposed through the third side surface opposite to the first side surface;

a ground part electrically connected to the second conductive portion at a point adjacent to the third nonconductive member;

a feeding part electrically connected to the third conductive portion at a point adjacent to the third nonconductive member; and a communication circuit electrically connected with at least one of the first conductive portion, the second conductive portion and the third conductive portion, wherein the first conductive portion forms a first part of the first side surface and a first part of the second side surface, wherein the second conductive portion forms a second part of the second side surface and a first part of the third side surface, and wherein the third conductive portion forms a second part of the third side surface.

18. The electronic device of claim 17, wherein the feeding part and the ground part face the second surface.

19. The electronic device of claim 17, further comprising a printed circuit board (PCB), wherein the ground part is electrically connected to the PCB.

20. The electronic device of claim 17, wherein the first feeding part is disposed on the first part of the third side surface.

* * * * *